United States Patent
Mun et al.

(10) Patent No.: US 11,683,146 B2
(45) Date of Patent: Jun. 20, 2023

(54) METHOD AND APPARATUS FOR TRANSMITTING AND RECEIVING A SIGNAL IN A WIRELESS COMMUNICATION SYSTEM

(71) Applicant: LG ELECTRONICS INC., Seoul (KR)

(72) Inventors: Chul Kyu Mun, Seoul (KR); Woochan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 17/342,905

(22) Filed: Jun. 9, 2021

(65) Prior Publication Data

US 2021/0391972 A1    Dec. 16, 2021

Related U.S. Application Data

(60) Provisional application No. 63/039,970, filed on Jun. 16, 2020.

(51) Int. Cl.
*H04L 5/14* (2006.01)
*H04L 5/00* (2006.01)
*H04L 1/00* (2006.01)

(52) U.S. Cl.
CPC .......... *H04L 5/1461* (2013.01); *H04L 1/0068* (2013.01); *H04L 5/0051* (2013.01)

(58) Field of Classification Search
CPC ... H04L 5/1461; H04L 1/0068; H04L 5/0051; H04L 25/0226; H04L 25/023; H04L 5/14; H04L 1/0001
See application file for complete search history.

(56) References Cited

U.S. PATENT DOCUMENTS

2018/0227906 A1*  8/2018  Yang ................... H04W 72/042

* cited by examiner

*Primary Examiner* — Eric Myers
(74) *Attorney, Agent, or Firm* — Lee Hong Degerman Kang Waimey

(57) ABSTRACT

A method of operating a user equipment (UE) in a wireless communication system is provided. The method includes obtaining resource allocation indication information from a base station through a control channel, determining a UE operation mode based on the resource allocation indication information, transmitting an uplink signal by allocating physical uplink shared channel (PUSCH) resource based on a physical downlink shared channel (PDSCH) demodulation reference signal (DMRS) received from the base station, when the UE operation mode is a full duplex multiplexing radio (FDR) mode, performing self-interference channel estimation based on a PUSCH DMRS resource location, and performing reception channel estimation based on the PDSCH DMRS and demodulating data.

9 Claims, 26 Drawing Sheets

METHOD AND APPARATUS FOR TRANSMITTING AND RECEIVING A SIGNAL IN A WIRELESS COMMUNICATION SYSTEM

CROSS-REFERENCE TO RELATED APPLICATION

Pursuant to 35 U.S.C. § 119(e), this application claims the benefit of U.S. Provisional Patent Application No. 63/039,970, filed on Jun. 16, 2020, the contents of which is hereby incorporated by reference herein in its entirety.

BACKGROUND OF THE INVENTION

Field of the Invention

The following description relates to a wireless communication system supporting full duplex multiplexing radio (FDR) and, more particularly, to a method and apparatus for transmitting and receiving a signal in a wireless communication system.

Description of the Related Art

A wireless communication system refers to a multiple access system supporting communication with multiple users by sharing available system resources (e.g., bandwidth, transmit power, etc.). Examples of the multiple access system include a code division multiple access (CDMA) system, frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) refers to a communication method of establishing a direct link between user equipments (UEs) and directly exchanging voice or data between the UEs without a base station (BS). SL is being considered as a method of solving the burden of the base station according to rapidly increasing data traffic.

In addition, the base station may allocate resources for uplink signals or resources for downlink signals to the UE or a vehicle. The base station may allocate the resources for the uplink signals to the UE or the vehicle through uplink control information (UCI) or allocate the resources for the downlink signals to the UE or the vehicle through downlink control information (DCI).

Meanwhile, as more communication devices require larger communication capacity, there is a need for improved mobile broadband communication as compared to existing radio access technology (RAT). Therefore, a communication system considering a service or UE sensitive to reliability and latency is being discussed. Next-generation radio access technology considering massive machine type communication (MTC) or ultra-reliable and low latency communication (URLLC) may be referred to as new radio access technology (RAT) or new radio (NR).

SUMMARY OF THE INVENTION

The present disclosure relates to a signal transmission/reception method and apparatus of a user equipment (UE) and a base station operating based on a full duplex multiplexing radio (FDR) mode.

The present disclosure relates to a method of allocating resource for self-interference mitigation based on an FDR mode in a wireless communication system.

The present disclosure relates to a method of allocating demodulation reference signal (DMRS) resource and data resource not to overlap each other based on an FDR mode in a wireless communication system.

The present disclosure relates to a method of exchanging a signal between a UE and a base station based on an FDR mode in a wireless communication system.

The technical problems solved by the present disclosure are not limited to the above technical problems and other technical problems which are not described herein will become apparent to those skilled in the art from the following description.

As an example of the present disclosure, it is possible to provide a method of operating a user equipment (UE) in a wireless communication system. The method may include obtaining resource allocation indication information from a base station through a control channel, determining a UE operation mode based on the resource allocation indication information, transmitting an uplink signal by allocating physical uplink shared channel (PUSCH) resource based on a physical downlink shared channel (PDSCH) demodulation reference signal (DMRS) received from the base station, when the UE operation mode is a full duplex multiplexing radio (FDR) mode, performing self-interference channel estimation based on a PUSCH DMRS resource location, and performing reception channel estimation based on the PDSCH DMRS and demodulating data. At this time, the PUSCH may be punctured at a location corresponding to the PDSCH DMRS resource and a PDSCH may be punctured at a location corresponding to the PUSCH DMRS resource.

In addition, as an example of the present disclosure, a user equipment (UE) in a wireless communication system may include a transceiver and a processor connected to the transceiver. At this time, the processor may be configured to obtain resource allocation indication information from a base station through a control channel, to determine a UE operation mode based on the resource allocation indication information, to transmit an uplink signal by allocating physical uplink shared channel (PUSCH) resource based on a physical downlink shared channel (PDSCH) demodulation reference signal (DMRS) received from the base station, when the UE operation mode is a full duplex multiplexing radio (FDR) mode, to perform self-interference channel estimation based on a PUSCH DMRS resource location, and to perform reception channel estimation based on the PDSCH DMRS and demodulating data. The PUSCH may be punctured at a location corresponding to the PDSCH DMRS resource and a PDSCH may be punctured at a location corresponding to the PUSCH DMRS resource.

In addition, the following matters are commonly applicable to the UE and the method of operating the UE.

In addition, as an example of the present disclosure, when the self-interference channel estimation is performed based on the PUSCH DMRS resource, estimation, cancellation and reconstruction of a self-interference signal may be performed based on the punctured PDSCH. In addition, as an example of the present disclosure, when the reception channel estimation is performed based on the PDSCH DMRS resource, the reception channel estimation may be performed in consideration of the punctured PUSCH.

In addition, as an example of the present disclosure, the UE operation mode may be set to the FDR mode, when the resource allocation indication information has a first value, and wherein the UE operation mode may be set to a half duplex multiplexing radio (HDR) mode, when the resource allocation indication information has a second value.

In addition, as an example of the present disclosure, when the UE operation mode is a half duplex multiplexing radio (HDF) mode, the PUSCH may not be punctured at a location corresponding to the PDSCH DMRS resource and a PDSCH may not be punctured at a location corresponding to the PUSCH DMRS resource.

In addition, as an example of the present disclosure, the control channel may further include resource allocation information of at least one of the PDSCH, the PDSCH DMRS, the PUSCH or the PUSCH DMRS.

In addition, as an example of the present disclosure, when the UE performs initial connection with the base station, capability information of the UE mode may be exchanged.

In addition, as an example of the present disclosure, when the UE supports the FDR mode based on capability information of the UE mode, the base station may determine the UE mode in consideration of at least one of quality of a link with the UE or a channel environment and generate the resource allocation indication information.

In addition, as an example of the present disclosure, it is possible to provide a method of operating a base station in a wireless communication system. the method may include determining an operation mode of the base station, transmitting resource allocation indication information to a user equipment (UE) through a control channel based on the determined operation mode of the base station, and transmitting a downlink signal by allocating physical downlink shared channel (PDSCH) resource based on a physical uplink shared channel (PUSCH) demodulation reference signal (DMRS) received from the UE, when the base station operation mode is an FDR mode, and perform self-interference channel estimation based on a PDSCH DMRS resource location. The PUSCH may be punctured at a location corresponding to the PDSCH DMRS resource and a PDSCH may be punctured at a location corresponding to the PUSCH DMRS resource.

In addition, as an example of the present disclosure, a base station in a wireless communication system may include a transceiver and a processor connected to the transceiver. At this time, the processor may be configured to determine an operation mode of the base station, to transmit resource allocation indication information to a user equipment (UE) through a control channel based on the determined operation mode of the base station, to transmit a downlink signal by allocating physical downlink shared channel (PDSCH) resource based on a physical uplink shared channel (PUSCH) demodulation reference signal (DMRS) received from the UE, when the base station operation mode is an FDR mode and to perform self-interference channel estimation based on a PDSCH DMRS resource location. The PUSCH may be punctured at a location corresponding to the PDSCH DMRS resource and a PDSCH may be punctured at a location corresponding to the PUSCH DMRS resource.

In addition, the following matters are commonly applicable to a base station and the method of operating the station.

In addition, as an example of the present disclosure, when the self-interference channel estimation is performed based on the PDSCH DMRS resource, estimation, cancellation and reconstruction of a self-interference signal may be performed based on the punctured PUSCH. In addition, as an example of the present disclosure, when the reception channel estimation is performed based on the PUSCH DMRS resource, the reception channel estimation may be performed in consideration of the punctured PDSCH.

In addition, as an example of the present disclosure, the base station operation mode may be set to the FDR mode when the resource allocation indication information has a first value, and the base station operation mode may be set to a half duplex multiplexing radio (HDR) mode when the resource allocation indication information has a second value.

In addition, as an example of the present disclosure, when the base station operation mode is a half duplex multiplexing radio (HDF) mode, the PDSCH may not be punctured at a location corresponding to the PUSCH DMRS resource and a PUSCH may not be punctured at a location corresponding to the PDSCH DMRS resource.

In addition, as an example of the present disclosure, the control channel may further include resource allocation information of at least one of the PDSCH, the PDSCH DMRS, the PUSCH or the PUSCH DMRS.

In addition, as an example of the present disclosure, a device includes at least one memory and at least one processor functionally connected to the at least one memory. The at least one processor may be configured to control the device to obtain resource allocation indication information from a base station through a control channel, to determine an operation mode of the device based on the resource allocation indication information, to transmit an uplink signal by allocating physical uplink shared channel (PUSCH) resource based on a physical downlink shared channel (PDSCH) demodulation reference signal (DMRS) received from the base station, when the operation mode of the device is a full duplex multiplexing radio (FDR) mode, to perform self-interference channel estimation based on a PUSCH DMRS resource location, and to perform reception channel estimation based on the PDSCH DMRS and demodulate data. The PUSCH may be punctured at a location corresponding to the PDSCH DMRS resource and a PDSCH may be punctured at a location corresponding to the PUSCH DMRS resource.

In addition, as an example of the present disclosure, it is possible to provide a non-transitory computer-readable medium having recorded thereon at least one instruction executable by a processor. The at least one instruction may indicate to perform control to enable a device to obtain resource allocation indication information from a base station through a control channel, to determine an operation mode of the device based on the resource allocation indication information, to transmit an uplink signal by allocating physical uplink shared channel (PUSCH) resource based on a physical downlink shared channel (PDSCH) demodulation reference signal (DMRS) received from the base station, when the operation mode of the device is a full duplex multiplexing radio (FDR) mode, to perform self-interference channel estimation based on a PUSCH DMRS resource location and to perform reception channel estimation based on the PDSCH DMRS and demodulate data. The PUSCH may be punctured at a location corresponding to the PDSCH DMRS resource and a PDSCH may be punctured at a location corresponding to the PUSCH DMRS resource.

The aspects of the present disclosure are only a part of the preferred embodiments of the present disclosure, and various embodiments based on technical features of the present disclosure may be devised and understood by the person with ordinary skill in the art based on the detailed description of the present disclosure.

The following effects can be obtained by the embodiments of the present disclosure.

According to the present disclosure, it is possible to provide a signal transmission and reception method of a UE and a base station operating based on an FDR mode in a wireless communication system.

According to the present disclosure, it is possible to provide an effect of preventing performance deterioration, by allocating resource for self-interference mitigation based on an FDR mode in a wireless communication system.

The present disclosure can provide an effect of preventing performance deterioration, by allocating demodulation reference signal (DMRS) resource and data resource not to overlap each other based on an FDR mode in a wireless communication system.

The present disclosure has an effect of providing a method of exchanging between a UE and a base station based on an FDR mode in a wireless communication system.

It will be appreciated by persons skilled in the art that that the effects that can be achieved through the embodiments of the present disclosure are not limited to the above-described effects and other effects which are not described herein may be understood by those skilled in the art from the following detailed description. That is, unintended effects in implementing the configuration described in the present disclosure may also be derived from the embodiments of the present disclosure by those of ordinary skill in the art.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DESCRIPTION OF THE PREFERRED EMBODIMENTS

Figure 1:
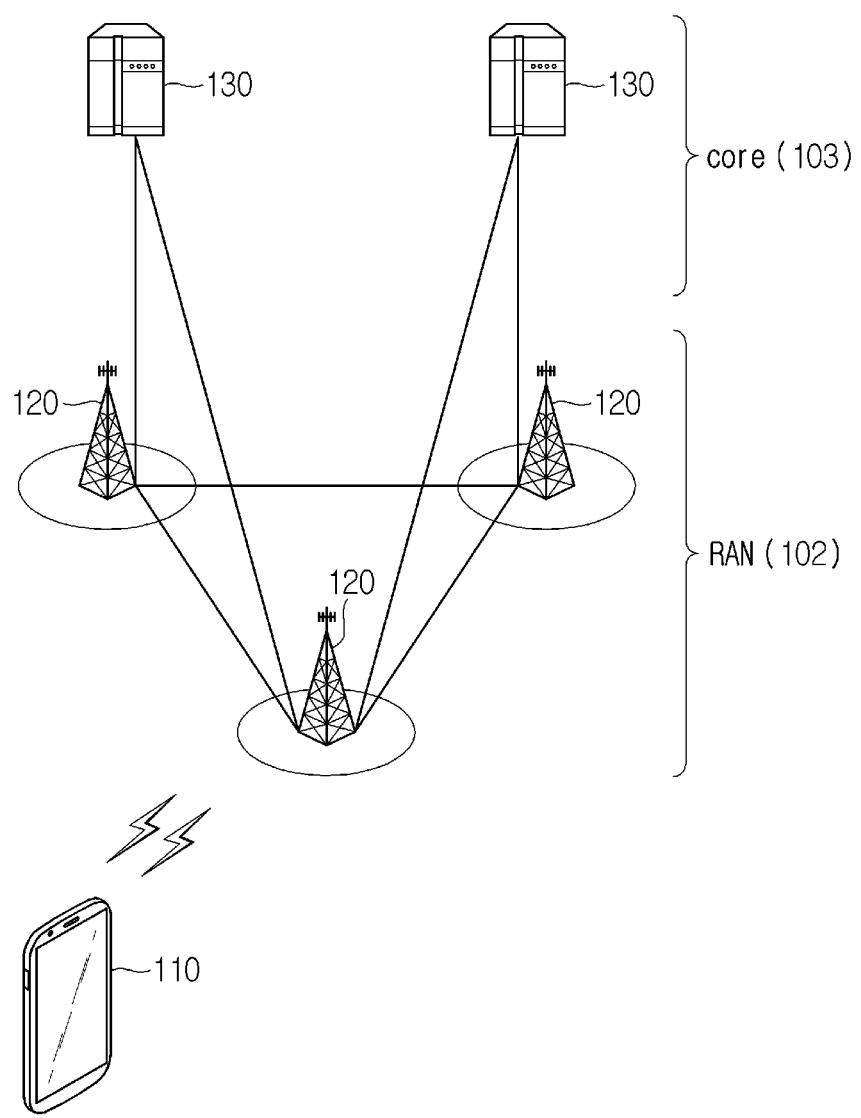
FIG. 1 illustrates the structure of a wireless communication system according to an embodiment of the present disclosure.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present invention unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In the present specification, "A or B" may mean "only A", "only B" or "both A and B". In other words, in the present specification, "A or B" may be interpreted as "A and/or B". For example, in the present specification, "A, B or C" may mean "only A, "only B", "only C" or "any combination of A, B and C".

A slash (/) or comma used in the present specification may mean "and/or". For example, "A/B" may mean "A and/or B". Therefore, "A/B" may mean "only A", "only B" or "both A and B". For example, "A, B, C" may mean "A, B or C".

In the present specification, "at least one of A and B" may mean "only A", "only B" or "both A and B". In addition, in the specification, "at least one of A or B" or "at least one of A and/or B" may be interpreted as being the same as "at least one of A and B".

In addition, in the present specification, "at least one of A, B and C" may mean "only A", "only B", "only C" or "any combination of A, B and C". In addition, in the specification, "at least one of A, B or C" or "at least one of A, B and/or C" may be interpreted as being the same as "at least one of A, B and C".

In addition, parentheses used in the present specification may mean "for example". Specifically, when "control information (PDCCH)" is described, "PDCCH" may be proposed as an example of "control information". In other words, "control information" of the present specification is not limited to "PDCCH" and "PDCCH" may be proposed as an example of "control information". In addition, even when "control information (that is, PDCCH)" is described, "PDCCH" may be proposed as an example of "control information".

In the following description, "when, if" or in case of may be replaced with "based on".

In this specification, technical features individually described in one drawing may be implemented individually or simultaneously.

In this specification, a higher layer parameter may be set for a user equipment (UE), preset or predefined. For example, a base station or a network may transmit a higher layer parameter to a UE. For example, the higher layer parameter may be transmitted through radio resource control (RRC) signaling or medium access control (MAC) signaling.

The following technology can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. IEEE 802.16m is an evolution of IEEE 802.16e and provides backward compatibility with a system based on IEEE 802.16e. UTRA is a part of Universal Mobile Telecommunications System (UMTS). Third generation partnership project (3GPP) long term evolution (LTE) is a part of Evolved UMTS (E-UMTS) using E-UTRA, adopting OFDMA for DL and SC-FDMA for UL. LTE-Advanced (LTE-A) is an evolution of 3GPP LTE.

5G NR is subsequent technology of LTE-A and is a new clean-state mobile communication system having features such as high performance, low latency and high availability. 5G NR may utilize all available spectral resources such as low frequency bands of less than 1 GHz to intermediate frequency bands of 1 GHz to 10 GHz or high frequency (millimeter) bands of 24 GHz or higher.

5G NR is focused upon in order to clarify the description but the technical idea of an embodiment of the present disclosure is not limited thereto.

For terms and technologies which are not specifically described among terms and technologies used in this specification, reference may be made to the wireless communication standard document published before application of this specification. For example, 3GPP TS36.XXX, 3GPP TS37.XXX and 3GPP38.XXX documents may be referenced.

Communication System Applicable to the Present Disclosure

FIG. 1 illustrates the structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The RAN 102 includes a base station 120 for providing a terminal 110 with a control plane and a user plane. The terminal 110 may be fixed or mobile and may be referred to as the other term such as user equipment (UE), mobile station (MS), subscriber station (SS), mobile subscriber station (MSS), mobile terminal or advanced mobile station (AMS), wireless device or the like. The base station 120 is a node for providing a radio access service to the terminal 110 and may be referred to as the other term such as a fixed station, a Node B, a eNode B (eNB), a gNode B (gNB), a ng-eNB, an advanced base station (ABS) or an access point (AP), a base transceiver system (BTS), or the like. The core network 103 includes a core network entity 130. The core network entity 103 may be variously defined according to the function and may be referred to as the other term such as a core node, a network node, a network equipment or the like.

The structural elements of the system may be referred to differently according to the applied system standard. In the case of LTE or LTE-A, the RAN 102 is an Evolved-UMTS Terrestrial Radio Access Network (E-UTRAN), and the core network 103 may be referred to as an evolved packet core (EPC). In this case, the core network 103 includes a mobility management entity (MME), a serving gateway (S-GW) and a packet data network-gateway (P-GW). The MME has access information of the terminal or information on the capabilities of the terminal, and such information is mainly used for mobility management of the terminal. The S-GW is a gateway with an E-UTRAN as an end point, and the P-GW is a gateway having a packet data network (PDN) as an end point.

In the case of the 5G NR standard, the RAN 102 is a NG-RAN, and the core network 103 may be referred to as a 5G core (5GC). In this case, the core network 103 includes an access and mobility management function (AMF), a user plane function (UPF), and a session management function (SMF). The AMF provides a function for access and mobility management of a terminal unit, the UPF performs a function for mutually transferring a data unit between a higher layer network and the RAN 102, and the SMF provides a session management function.

The base stations 120 may be connected to each other through an Xn interface. The base station 120 may be connected to the core network 103 through an NG interface. More specifically, the base station 120 may be connected to the AMF through an NG-C interface, and may be connected to the UPF through an NG-U interface.

Radio Resource Structure

Figure 2:
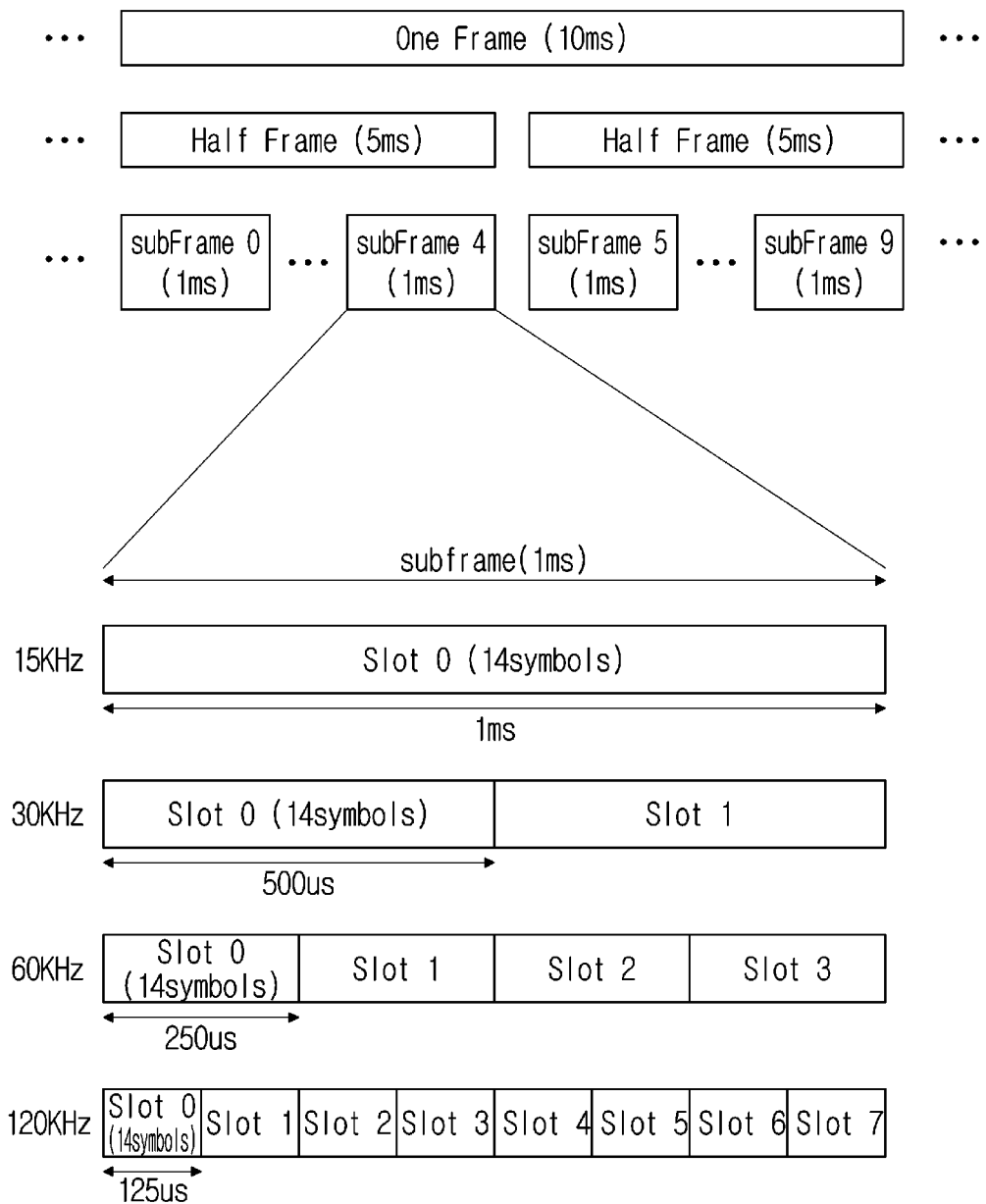
FIG. 2 illustrates the structure of a radio frame of NR according to an embodiment of the present disclosure.

FIG. 2 illustrates the structure of a radio frame of NR according to an embodiment of the present disclosure. The embodiment of FIG. 2 may be combined with various embodiments of the present disclosure.

Referring to FIG. 2, in NR, a radio frame may be used in uplink and downlink transmission. A radio frame has a length of 10 ms and may be defined as two 5-ms half-frames (HFs). The half-frame includes five 1-ms subframes (SFs). The subframe may be divided into one or more slots and the number of slots in the subframe may be determined according to a subscriber spacing (SCS). Each slot may include 12 or 14 OFDM(A) symbols according to a cyclic prefix (CP).

When a normal CP is used, each slot may include 14 symbols. When an extended CP is used, each slot may include 12 symbols. Here, the symbol may include an OFDM symbol (or a CP-OFDM symbol) and an SC-FDMA (Single Carrier-FDMA) symbol (or a DFT-s-OFDM (Discrete Fourier Transform-spread-OFDM) symbol).

When the normal CP is used, the number $N_{slot}^{symb}$ of symbols per slot, the number $N^{frame,\mu}_{slot}$ of slots per frame and the number $N^{subframe,\mu}_{slot}$ of slots per subframe may vary according to the SCS configuration (u). For example, SCS (=15*2$^\mu$), $N^{slot}_{symb}$, $N^{frame,\mu}_{slot}$, and $N^{subframe,\mu}_{slot}$ may be 15 KHz, 14, 10 and 1 in the case of u=0, may be 30 KHz, 14, 20 and 2 in, the case of u=1, may be 60 KHz, 14, 40, 4 in the case of u=2, may be 120 KHz, 14, 80 and 8 in the case of u=3, and may be 240 KHz, 14, 160, 16 in the case of u=4. In contrast, when the extended CP is used, SCS(=15*2$^\mu$), $N^{slot}_{symb}$, $N^{frame,\mu}_{slot}$, and $N^{subframe,\mu}_{slot}$ may be 60 KHz, 12, 40 and 4 in the case of u=2. In the NR system, an OFDM(A) numerology (e.g., SCS, CP length, etc.) may be differently set among a plurality of cells merged into one terminal. Accordingly, the (absolute time) duration of time resources (e.g., a subframe, a slot or a TTI) (for convenience, collectively referred to as a time unit (TU)) consisting the same number of symbols may be differently set between merged cells.

In NR, a plurality of numerologies or SCS supporting various 5G services may be supported. For example, a wide area in typical cellular bands may be supported when SCS is 15 kHz, and dense-urban, lower latency and wider carrier bandwidth may be supported when SCS is 30 kHz/60 kHz. When SCS is 60 kHz or higher, bandwidth greater than 24.25 GHz may be supported in order to overcome phase noise.

The NR frequency band may be defined as two types of frequency ranges. The two types of frequency ranges may be FR1 and FR2. The numerical value of the frequency range may be changed and, for example, frequency ranges corresponding to FR1 and FR2 may be 450 MHz to 6000 MHz and 24250 MHz to 52600 MHz. In addition, the supported SCS may be 15, 30 and 60 kHz in the case of FR1, and may be 60, 120 and 240 kHz in the case of FR2. Among the frequency ranges used in the NR system, FR1 may mean "sub 6 GHz range", and FR2 may mean "above 6 GHz range" and may be called as millimeter wave (mmW).

As described above, the numerical value of the frequency range of the NR system may be changed. For example, as compared to the above-described example of the frequency range, FR1 may be defined as including a band of 410 MHz to 7125 MHz. That is, FR1 may include a frequency band of 6 GHz (or 5850, 5900, 5925 MHz, etc.) or higher. For example, a frequency band of 6 GHz (or 5850, 5900, 5925 MHz, etc.) included in FR1 may include an unlicensed band. The unlicensed band may be used for various purposes and may be used, for example, for vehicle communication (e.g., autonomous driving).

Figure 3:
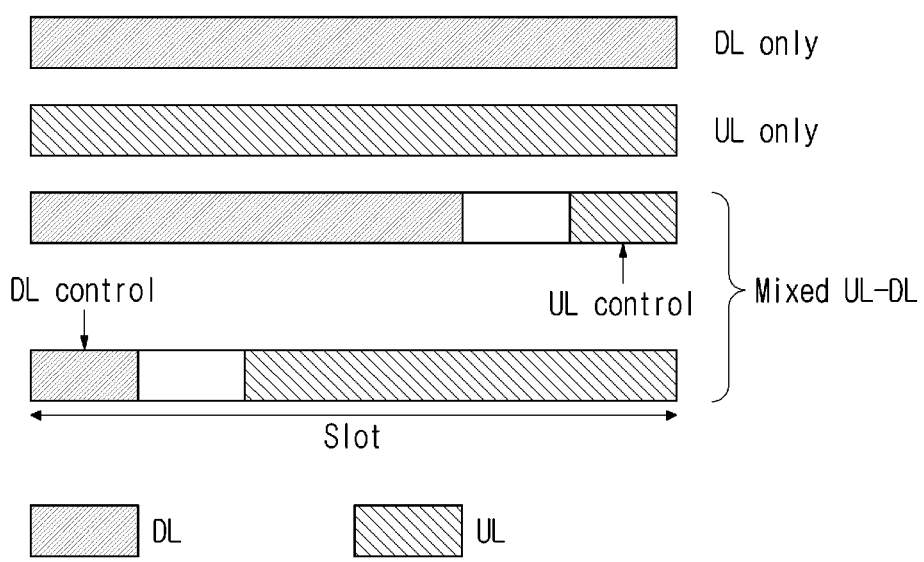
FIG. 3 illustrates the structure of a self-contained slot according to an embodiment of the present disclosure.

FIG. 3 illustrates the structure of a self-contained slot according to an embodiment of the present disclosure.

In the NR system, a frame is characterized by a self-contained structure in which a DL control channel, DL or UL data, a UL control channel, etc. may all be included in one slot. For example, the first N symbols in the slot may be used to transmit a DL control channel (hereinafter referred to as a DL control region) and the last M symbols in the slot may be used to transmit a UL control channel (hereinafter referred to as a UL control region). N and M are integers of 0 or more. A resource region (hereinafter referred to as a data region) between a DL control region and a UL control region may be used for DL data transmission or UL data transmission. For example, the following configurations may be considered. Durations was listed in chronological order.

1. DL only configuration
2. UL only configuration
3. Mixed UL-DL configuration
   DL region+GP (Guard Period)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region and a PDSCH may be transmitted in the DL data region. A PUCCH may be transmitted in the UL control region and a PUSCH may be transmitted in the UL data region. In the PDCCH, DCI (Downlink Control Information), for example, DL data scheduling information, UL data scheduling information, etc. may be transmitted. In the PUCCH, UCI, for example, ACK/NACK (Positive Acknowledgement/Negative Acknowledgement) information related to DL data, CSI (Channel State Information) information, SR (Scheduling Request), etc. may be transmitted. The GP provides a time gap in a process of switching a transmission mode to a reception mode or switching from a reception mode to a transmission mode in a base station (BS) and a UE. Some symbols at a point in time when DL is switched to UL within the subframe may be set as a GP.

Overview of FDR System and Interference Element in FDR

The FDR system enables simultaneous transmission and reception of uplink and downlink signals on the same frequency band. Accordingly, the FDR system may increase spectral efficiency up to two times that of the existing system for transmitting and receiving uplink and downlink signals by dividing a frequency or time and thus is being spotlighted as one of the core technologies of a next-generation mobile communication system.

From the viewpoint of any wireless device, an FDR technology using a single frequency transmission band may be defined as a transmission resource configuration method of simultaneously performing transmission and reception through a single frequency transmission band. As a special example thereof, the FDR technology may be represented as a transmission resource configuration method of simultaneously performing, for wireless communication between a general access node (e.g., a base station, a repeater, a relay node, a remote radio head (RRH), etc.) and a wireless terminal, downlink transmission and uplink reception of the base station and downlink reception and uplink transmission of the wireless UE through a single frequency transmission band. As another example, the FDR technology may be represented as a transmission resource configuration method of simultaneously performing transmission and reception between wireless UEs in the same frequency transmission band in a situation of device-to-device direct communication (D2D) between wireless UEs.

Hereinafter, although the present disclosure describes proposed technologies related to FDR such as wireless transmission and reception between a general base station and a wireless UE, various proposed embodiments are applicable to a network wireless device for performing wireless transmission and reception with a UE other than a general base station and direct UE-to-UE communication between UEs.

Figure 4:
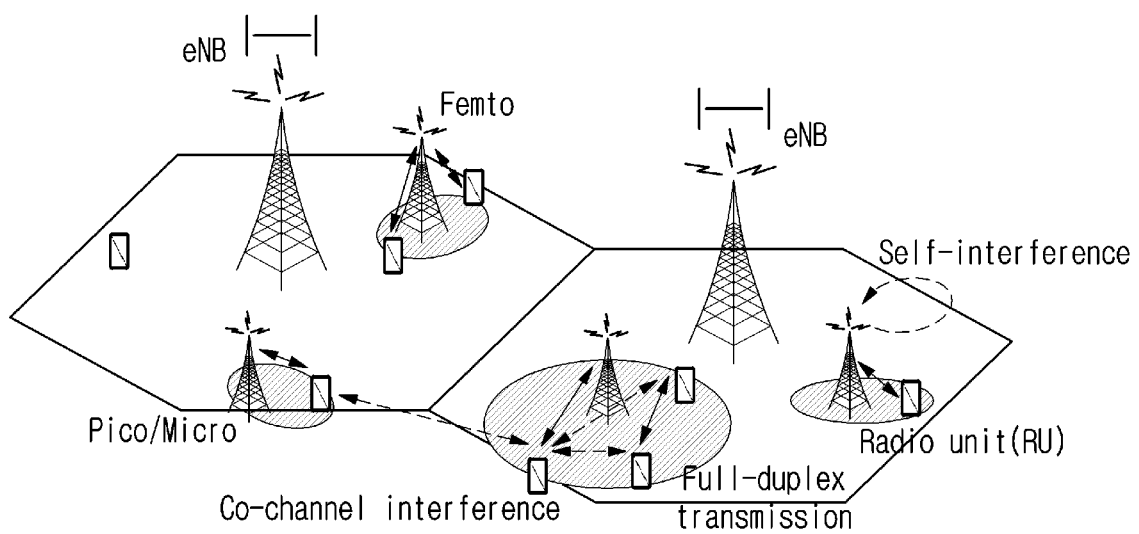
FIG. 4 illustrates the concept of a user equipment (UE) and a base station supporting full duplex radio (FDR) according to an embodiment of the present disclosure.

FIG. 4 illustrates the concept of a user equipment (UE) and a base station supporting full duplex radio (FDR) according to an embodiment of the present disclosure. In the FDR situation shown in FIG. 4, there may be a total of three types of interference as follows.

Intra-device self-interference: Since transmission and reception are performed using the same time and frequency resources, a device simultaneously receives not only a desired signal but also a signal transmitted by the device. In this case, the signal transmitted by the device is received by a receive antenna of the device with little attenuation and thus is received with much greater power than the desired signal, thereby acting as interference.

UE to UE inter-link interference: This means that an uplink signal transmitted by a UE is received by an adjacent UE, thereby acting as interference.

BS to BS inter-link interference: This means that a signal transmitted between BSs or heterogenous base stations (e.g., a picocell, a femtocell or a relay node) in a HetNet situation is received by a receive antenna of another base station, thereby acting as interference.

Among the above three types of interference, intra-device self-interference (SI) occurs only in the FDR system. The SI greatly degrades performance of the FDR system, which is treated as a first problem to be solved in order to operate the FDR system.

Figure 5:
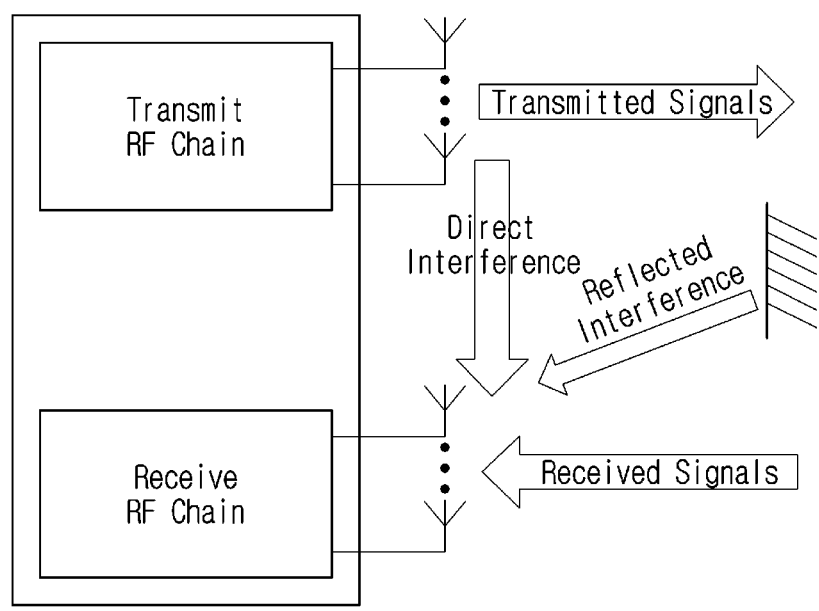
FIG. 5 illustrates an example of transmit/receive link and self-interference in a FDR communication situation according to an embodiment of the present disclosure.

FIG. 5 illustrates an example of transmit/receive link and self-interference in a FDR communication situation according to an embodiment of the present disclosure.

As shown in FIG. 5, SI may be classified into direct interference in which a signal transmitted by a transmit antenna directly enters a receive antenna without path attenuation and reflected interference reflected by a surrounding terrain. The intensity of the direct interference and the reflected interference is generally greater than that of the desired signal because of a difference in physical distance. Due to such a large intensity of interference, effective cancellation of SI is essential for operating the FDR system.

In order to efficiently operate the FDR system, requirements of self-interference cancellation (self-IC) according to maximum transmit power may be determined as shown in Table 1 below.

TABLE 1

| Node Type | Max. Tx Power ($P_A$) | Thermal Noise (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

According to the bandwidth of a mobile communication system, a thermal noise value may be determined by $N_{O,BW}=-174$ dBm$+10\times\log_{10}$(BW), and Table 1 shows thermal noise on the assumption of bandwidth of 20 MHz. A receiver noise figure (NF) is an example of considering the worst case of the 3GPP standard requirements. A receiver thermal noise level may be determined by a sum of thermal noise in specific BW and receiver NF.

Referring to Table 1, it can be seen that self-interference cancellation performance of 119 dBm is required in order for a UE to efficiently drive the FDR system in bandwidth of 20 MHz. In order to obtain such self-interference cancellation performance, there are a total of three steps of self-interference cancellation techniques, which will be described below in detail.

antenna self-IC: This is a technique to be preferentially executed among all self-interference cancellation techniques, and SI cancellation is performed at an antenna end. As a simplest way, a material capable of blocking signals between transmit and receive antennas may be installed to physically block transmission of an SI signal, a distance between antennas may be intendedly controlled using multiple antennas or the phase of a specific transmitted signal may be inverted to cancel some SI signals. In addition, some SI signals may be canceled using a multi-polarized antenna or a directional antenna.

analog self-IC: This is a technique that cancels interference at an analog end before a received signal passes through an analog-to-digital converter (ADC) and cancels SI signals using a duplicated analog signal. This may be performed in an RF domain or an IF domain.

A method of cancelling an SI signal will be described below in detail. A transmitted analog signal is delayed in time and then a duplicated signal of the actually received SI signal may be generated by adjusting a magnitude and a phase thereof, and subtracted from a signal received by a receive antenna. However, since processing is performed using the analog signal, additional distortion may occur due to implementation complexity and circuit characteristics, thereby greatly changing interference cancellation performance.

digital self-IC: This is a technique that cancels interference after a received signal passes through an ADC and includes all interference cancellation techniques performed in a baseband domain. As a simplest way, a duplicated signal of SI may be generated using a transmitted digital signal and subtracted from a received digital signal. Alternatively, techniques for preventing a signal transmitted by a UE or a base station from being received by a receive antenna by performing precoding/postcoding in the baseband using multiple antennas may also be classified as digital self-interference cancellation.

However, since digital self-interference cancellation is feasible when a digitally modulated signal is quantized enough to restore information on a desired signal, there is a need for a precondition that a difference in signal power level between an interference signal remaining after cancelling interference using one or more of the above-described techniques and the desired signals is within an ADC range.

Figure 6:
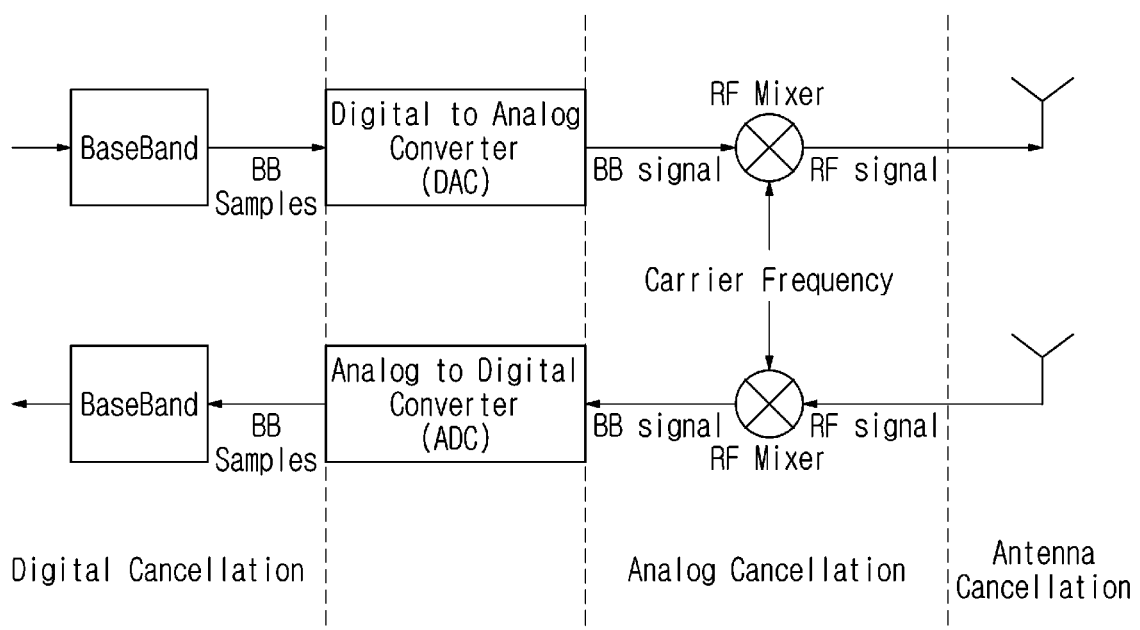
FIG. 6 illustrates a position, to which three interference techniques at a radio frequency (RF) front end is applied, according to an embodiment of the present disclosure.

Positions, to which the above-described three self-interference cancellation techniques are applied, are shown in FIG. 6. FIG. 6 illustrates positions, to which three interference techniques at a radio frequency (RF) front end is applied, according to an embodiment of the present disclosure. Referring to FIG. 6, antenna cancellation for performing antenna self-interference cancellation is applied to an antenna section, analog cancellation for performing analog self-interference cancellation is applied to a section including a mixer for converting a baseband signal into an RF signal, and digital cancellation for performing digital self-interference cancellation is applied to a section before digital-to-analog converter (DAC) input and after ADC output.

Figure 7:
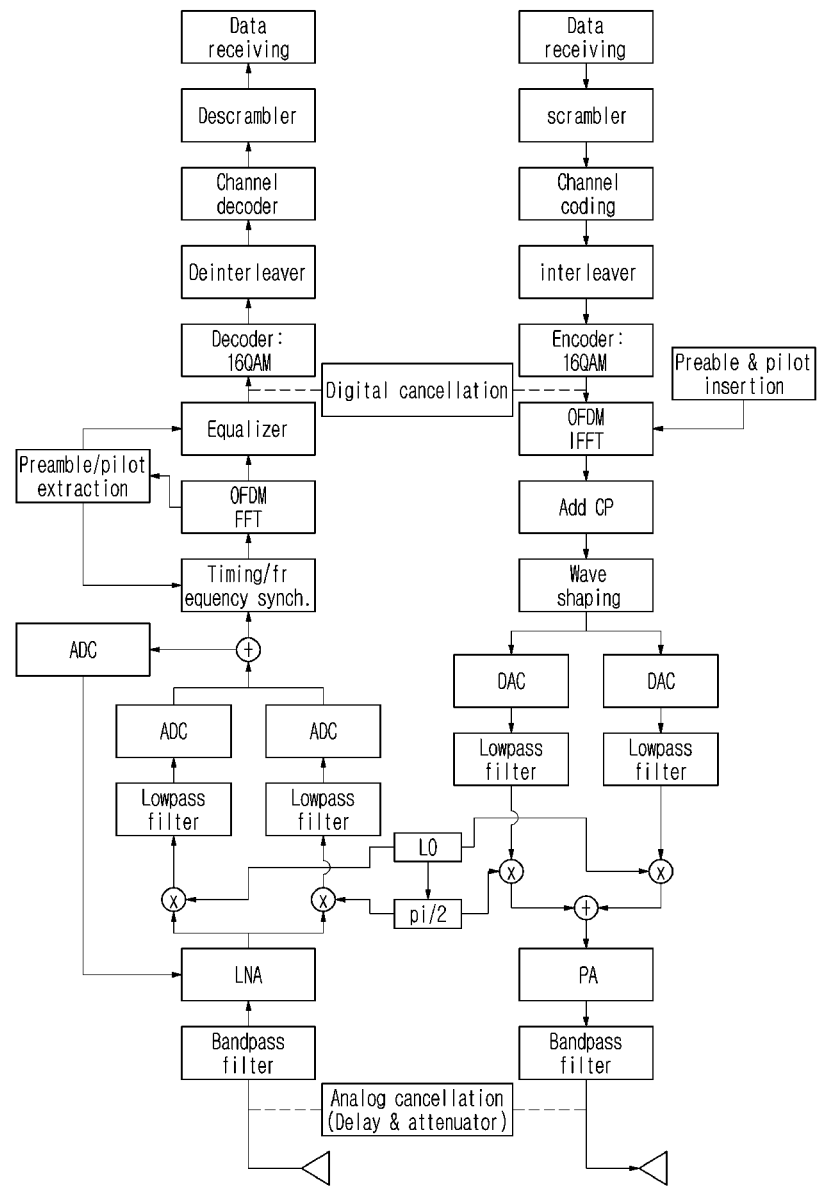
FIG. 7 illustrates the structure of a transceiver for self-interference cancellation in a communication device according to an embodiment of the present disclosure.

FIG. 7 illustrates the structure of a transceiver for self-interference cancellation in a communication device according to an embodiment of the present disclosure. In FIG. 7, a digital cancellation block for performing digital self-interference cancellation performs interference cancellation using digital self-interference signal (digital SI) before the DAC and after passing through the ADC. However, in another example, digital self-interference cancellation may be performed using a digital self-interference signal after passing through an IFFT and before passing through an FFT. In addition, although FIG. 7 shows a structure for canceling a self-interference signal by separating a transmit antenna and a receiver antenna, an antenna interference cancellation technique using one antenna may be used in another example. In this case, the antenna structure may be different from the example of FIG. 7. To this end, a function block suitable for a purpose may be further added or deleted.

Signal Modeling of FDR System

The FDR system uses the same frequency between the transmitted signal and the received signal and thus are greatly affected by non-linear components in RF. In particular, the transmitted signal may be distorted by the non-linear characteristics of active elements such as the power amplifier of a transmit RF chain and a low noise amplifier (LNA) of a receive RF chain, and distortion may also be caused by a mixer in the transmit and receive RF chains. Due to such distortion, the transmitted signal may be modeled as generating a high-order component. Among them, an even-order component is generated around direct current (DC) and in a high frequency region corresponding to several times a center frequency and thus may be efficiently removed using an existing alternative current (AC) coupling or filtering technique. However, an odd-order component is generated adjacent to an existing center frequency and is not easily removed, unlike the even-order component, thereby having great influence upon reception. In consideration of the non-linear characteristics of the odd-order component, the received signal after the ADC in the FDR system is expressed using a parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(x) + z(n), \quad \text{[Equation 1]}$$

In Equation 1, y(n) denotes a received signal, $h_D(n)$ denotes a channel experienced by desired data, $x_D(n)$ denotes desired data to be received, $h_{SI,k}(n)$ denotes a self-channel experienced by transmitted data, $x_{SI}(n)$ denotes transmitted data, and z(n) denotes additive white gaussian noise (AWGN). $h_{SI,k}(n)$ is a linear component when k is 1 and is a non-linear component when k is an odd number of 3 or more.

In order to cancel the above-described analog or digital self-interference, it is necessary to estimate a self-channel. In this case, a received signal after performing self-interference cancellation using gain of the estimated analog or digital self-channel may be expressed as shown in Equation 2 below.

$$y_{Self-IC}(n) = h_D(n) * x_D(n) + \underbrace{\sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)}_{\text{Residual SI}}, \quad \text{[Equation 2]}$$

In Equation 2, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Thereafter, a result of decoding the received signal using the gain of the estimated desired channel is shown in Equation 3 below.

$$\frac{\hat{h}_D^*(n) y_{Self-IC}(n)}{|\hat{h}_D^*(n)|^2} = \frac{\hat{h}_D^*(n) * h_D(n)}{|\hat{h}_D^*(n)|^2} x_D(n) + \frac{\hat{h}_D^*(n) * z'(n)}{|\hat{h}_D^*(n)|} \quad \text{[Equation 3]}$$

$$= x_D(n) + \frac{\hat{h}_D^*(n) * e(n)}{|\hat{h}_D^*(n)|^2} + \frac{\hat{h}_D^*(n) * z'(n)}{|\hat{h}_D^*(n)|}$$

$$z'(n) = \sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)$$

$$e(n) = h_D(n) - \hat{h}_D(n)$$

In Equation 3, $\hat{h}_D(n)$ denotes an estimated desired channel, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Figure 8:
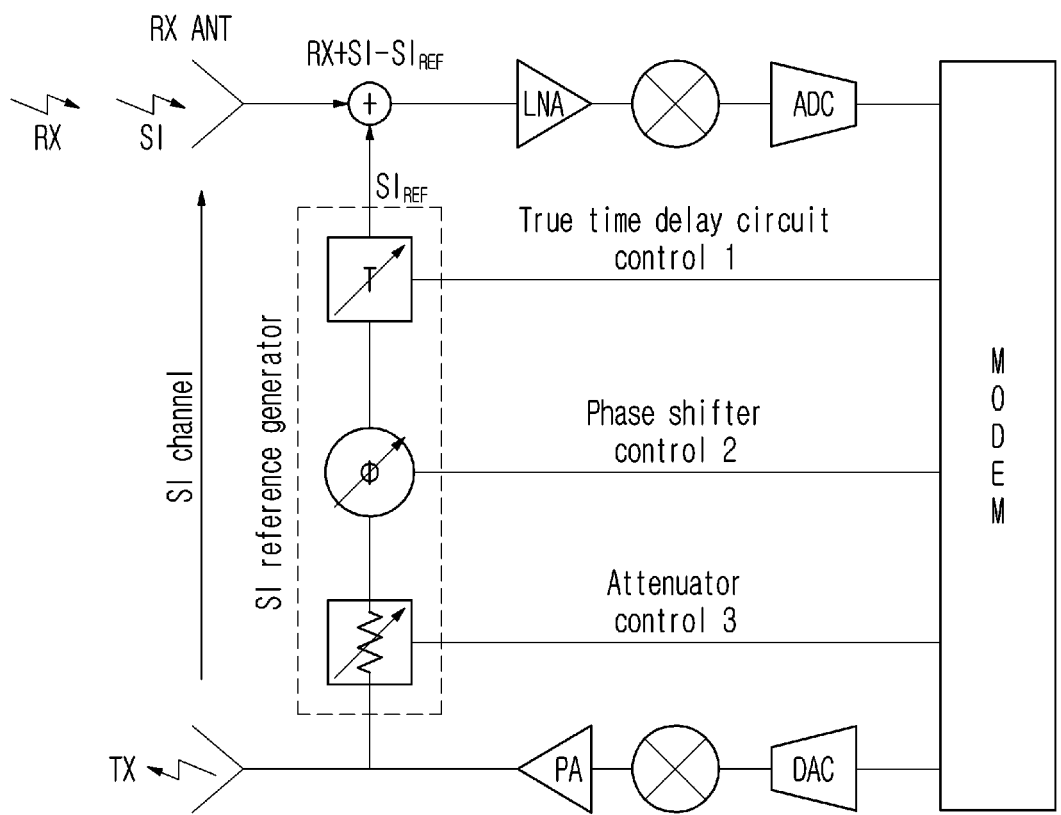
FIG. 8 illustrates an example of an RF chain of a communication device for self-interference signal cancellation according to an embodiment of the present disclosure.

FIG. 8. illustrates an example of an RF chain of a communication device for self-interference signal cancellation according to an embodiment of the present disclosure.

In order to cancel a self-interference signal in a communication device using a FDR method, a duplicated signal equal to the self-interference signal (hereinafter referred to as a "self-interference reference signal") is necessary. Referring to FIG. 8, in order to cancel the self-interference signal, a method of subtracting a self-interference reference signal $SI_{REF}$ from a self-interference signal before the LNA of a receive chain is generally used. In this case, in order to generate the self-interference reference signal $SI_{REF}$ in the communication device, a transmitted signal of a transmission end is branched. In the example of FIG. 8, a TX signal is branched after passing through a PA in the transmission end. A portion of the branched transmitted signal passes through an SI reference generator including an attenuator, a phase shifter and a time delay circuit. A self-interference reference generator mimics a self-interference channel and generates a self-interference reference signal $SI_{REF}$ from the branched transmitted signal. In this case, a channel experienced by the self-interference signal is separately estimated such that the self-interference reference generator mimics the self-interference channel.

First, the communication device may generate a control signal for the time delay circuit, a control signal for the phase shifter and a control signal for the attenuator, after estimating the self-interference channel. In this case, a desired RX signal should not be input to a self-interference reference signal path.

There are two methods for controlling the self-interference reference generator by the communication device. As a first method, the communication device may stop communication and transmit a signal for estimating a self-interference channel (e.g., a pilot signal or a reference signal) in an allocated communication band or channel band in order to separately estimate a channel, into which a self-interference signal is introduced, and the self-interference reference generator may mimic a self-interference signal based on information on the signal for estimating the self-interference channel during communication. As a second method, the communication device may transmit a signal for estimating a self-interference signal channel (e.g., a reference signal, a pilot signal or a tone) at both ends of a communication channel band (e.g., guard bands) and control the self-interference reference generator to reduce the signal for estimating the self-interference signal channel according to an adaptive feedback algorithm.

In the first method, in order to find the optimized state of the self-interference reference generator, it is first necessary to estimate the self-interference channel. To this end, a transmission device and a reception device should stop communication. Moreover, even if complete self-interference channel is performed, very accurate calibration of a self-interference reference path is required. The channel of the self-interference reference path is preferably represented by a look-up table based on a combination of all control voltages. Even if an accurate look-up table is created at a specific transmit power and temperature, this is changed according to the original Tx power and the temperature of the circuit. Therefore, self-interference signal cancellation performance may deteriorate due to calibration measurement errors and a difference between current transmit power and temperature and conditions when the look-up table is created. In addition, the first method cannot follow the self-interference signal channel varying over time.

In the second method, since the communication device transmits the signal for estimating the self-interference signal channel (e.g., a tone, a pilot signal, a reference signal, etc.) at both sides of the communication band, communication may not be stopped. In addition, in the second method, since the self-interference reference generator is controlled using an adaptive feedback algorithm in a time-continuous manner, calibration of the self-interference reference generator is unnecessary. However, since the self-interference reference generator is controlled using guard bands at the both sides of the communication band instead of the communication band, a self-interference signal may not be canceled due to transmission of a tone inside the most important communication band.

Figure 9:
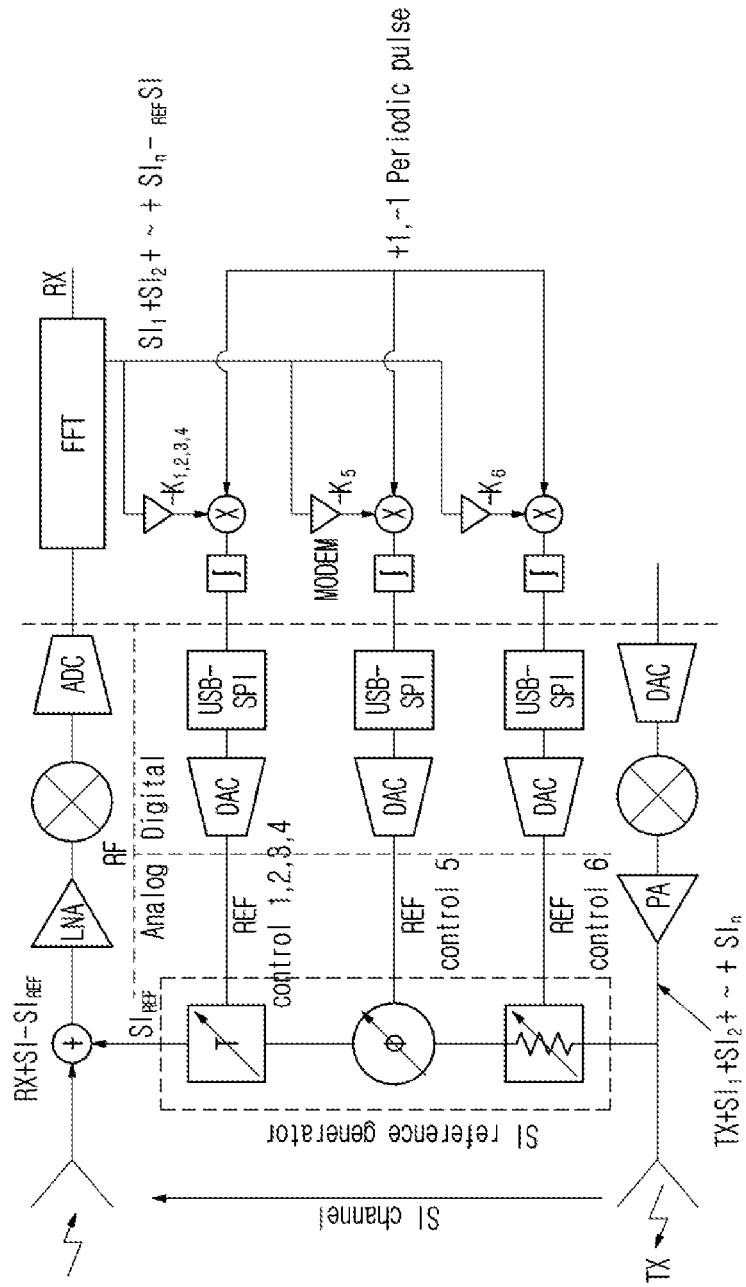
FIG. 9 illustrates another example of an RF chain of a communication device for self-interference signal cancellation according to another embodiment of the present disclosure.

FIG. 9 illustrates another example of an RF chain of a communication device for self-interference signal cancellation according to another embodiment of the present disclosure.

Referring to FIG. 9, the RF chain of the communication device may include a communication modem, a self-interference reference generator, a Tx antenna, an Rx antenna, etc. The communication modem may include a fast Fourier transform (FFT) block and integrators. The self-interference reference generator may include an attenuator, a phase shifter and a time delay circuit.

The self-interference reference generator may control the attenuator, the phase shifter and the time delay circuit in an analog manner in order to generate or duplicate an precise self-interference reference signal. To this end, the RF chain may include at least one DAC for converting a control signal transmitted from a communication mode into an analog signal.

Based on the concept of the time delay circuit basically defined as phase shift versus the slope of a frequency band, it is impossible to control time delay with only information at one a single frequency. Accordingly, in order to perform self-interference signal cancellation in a wide band, information at least two frequencies is required, such that two or more pilot signals, two or more reference signals or two or more tones may be transmitted as test signals.

In order to control the self-interference reference generator, multi-reference signals, multi-tones or multi-pilot signals may be used as test signals. First, in FIG. 9, the communication modem may monitor a power sum of multi-tones at a frequency at which the multi-tones as the test signals are located and measure power of each multi-tone at a frequency location where the multi-tones are transmitted, thereby calculating a sum of powers. Here, power measured at the frequency location of the transmitted tone corresponds to the power of the self-interference signal.

The communication modem may transmit a control signal such that a difference between a power sum of self-interference signals due to the multi-tones and the power of the self-interference reference signal is minimized. That is, the communication modem may feed the control signal back to the self-interference reference generator such that the sum of the powers of the self-interference signals due to the multi-tones is minimized. The self-interference reference generator generates a self-interference reference signal according to the fed-back control signal. In order to remove the measured power sum of the self-interference signals, the communication modem may generate a self-interference reference signal with power closest to the power sum.

The communication modem may control the self-interference reference generator until the power sum $SI=SI_1+SI_2+SI_3+\ldots+SI_n$ of the self-interference signals is minimized using an adaptive feedback loop. Here, $SI_n$ is power of the self-interference signal measured at a frequency location where an n-th reference signal of a plurality of reference signals is transmitted. The communication modem uses a periodic pulse signal of +1 and −1 such that the sign of the increment of a bias voltage controlled by the loop function of adaptive feedback is changed. Here, the loop function means a function for searching around a current variable in the feedback loop including a variable to be controlled.

The communication modem may feed the control signal back to the phase shifter, the attenuator and the time delay circuit using the adaptive feedback loop, such that the self-interference reference generator generates a self-interference reference signal with power closest to the power sum of the self-interference signals.

The method of controlling generation of the self-interference reference signal described with reference to FIG. 9 has an advantage that complicated channel estimation and calibration are unnecessary because the adaptive feedback algorithm operates with only the power sum of the multi-tones.

Figure 10:
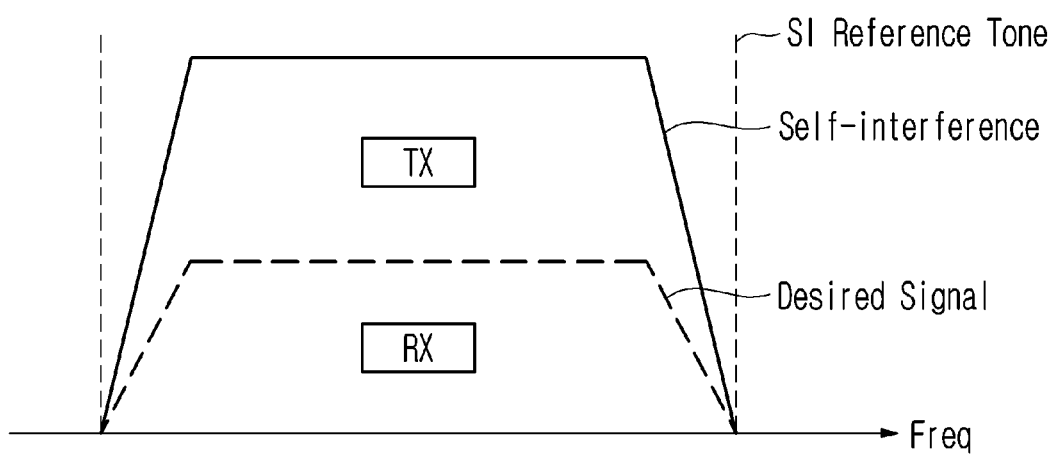
FIG. 10 illustrates examples of two tones used to generate a self-interference reference signal according to an embodiment of the present disclosure.

FIG. 10 illustrates examples of two tones used to generate a self-interference reference signal according to an embodiment of the present disclosure. FIG. 10 shows two tones transmitted at both sides (e.g., guard bands) of the communication band in order to control the self-interference reference generator of FIG. 8 or 9.

Referring to FIG. 10, tones for estimating the self-interference signal channel may be transmitted at the guard bands located at both ends of the communication channel band and the self-interference reference generator may be controlled to reduce tones according to the adaptive feedback algorithm. In this case, a desired signal, from which self-interference is canceled, may be stably received.

Detailed Embodiment of the Present Disclosure

For example, in an existing half-duplex multiplexing radio (HDR) mode, for resource allocation of a physical downlink control channel (PDSCH) and a PDSCH demodulation reference signal (DMRS), a control channel of a corresponding slot and a resource allocation method corresponding thereto are applicable. In addition, for resource allocation of a physical uplink control channel (PUSCH) and a PUSCH DMRS, a resource allocation method is applicable according to a control channel of a corresponding slot.

On the other hand, in the full-duplex multiplexing radio (FDR) mode, as described above, when data is transmitted and received by allocating resource in the PDSCH/PDSCH DMRS and the PUSCH/PUSCH DMRS, performance deterioration may occur. More specifically, a UE operating based on the FDR mode may perform self-interference cancellation operation in order to cancel, estimate and reconstruct a signal distorted by a self-interference signal in a process of reconstructing a downlink signal. In the corresponding process, and, when resource is allocated in the same manner as the related art, remarkable deterioration may occur in a received signal reconstruction performance.

For example, when transmission and reception are performed based on the FDR mode, a transmitted signal may be applied as a self-interference signal. At this time, since a received signal is transmitted from a relatively greater distance than a transmitted signal, received signal power is attenuated according to the distance and is significantly smaller than transmitted signal power. For example, uplink signal power of a UE operating based on the FDR mode may be significantly greater than power of a downlink signal received from a base station. Accordingly, it is necessary to estimate and cancel a self-interference signal such that interference with a transmitted signal as a self-interference signal input to a receiver of a UE is equal to or less than a noise level and to reduce influence on demodulation performance.

Similarly, downlink signal power of a base station operating based on the FDR mode may be significantly greater than power of an uplink signal received from a UE. Accordingly, it is necessary to estimate and cancel a self-interference signal such that interference with a transmitted signal as a self-interference signal input to a receiver of a base station is equal to or less than a noise level and to reduce influence on demodulation performance.

That is, a device (UE/base station) for performing transmission and reception based on the FDR mode needs to perform estimation and cancellation of a self-interference signal (SI) by a transmitted signal in a transmission and reception process. To this end, the device (UE/base station) needs to accurately estimate a channel for the self-interference signal (SI). In consideration of the above points, the device needs to use a DRMS included in the self-interference signal. For example, the UE may use a PUSCH DMRS included in an uplink signal as the self-interference signal for self-interference signal estimation and cancellation. As another example, the base station may use a PDSCH DMRS included in a downlink signal as the self-interference signal for self-interference signal estimation and cancellation, which will be described later.

As another example, for robust received signal demodulation in a state in which residual self-interference is present, it is necessary to perform a channel estimation and channel demodulation process with respect to the received signal. In addition, the UE may use a PDSCH DMRS for estimation and reconstruction of the downlink signal which is the received signal. In addition, the base station may use a PUSCH DMRS for estimation and reconstruction of the uplink signal which is the received signal.

That is, a device (UE/base station) operating based on the FDR mode may estimate and cancel self-interference and estimate and reconstruct a signal using the DMRS of the transmitted signal and the DRMS of the received signal. Here, for example, when PDSCH/PDSCH DMRS and PUSCH/PUSCH DMRS resource is allocated based on the existing HDR based resource allocation, resources may overlap each other and overlapping resources may cause performance deterioration due to self-interference signal cancellation. In addition, for example, in a UE operating based on the FDR mode, performance deterioration may occur in estimation, reconstruction and cancellation due to interference due to resource transmitted in downlink at a PUSCH DMRS location transmitted in a process of estimating a self-interference (SI) signal in a received signal. Similarly, in a base station operating based on the FDR mode, interference may occur due to uplink resource transmitted at a PDSCH DMRS location transmitted in a process of estimating a self-interference (SI) signal in a received signal. Therefore, performance deterioration may occur in an estimation, reconstruction and cancellation process.

In addition, for example, in the UE operating based on the FDR mode, a residual SI component in a received signal acts as additional interference in a demodulation process of the received signal, and performance deterioration may occur in estimation and reconstruction. Similarly, in the base station operating based on the FDR mode, a residual SI component in a received signal acts as additional interference in a demodulation process of the UL received signal, and performance deterioration may occur in estimation and reconstruction.

Accordingly, when the PDSCH/PDSCH DMRS and PUSCH/PUSCH DMRS are allocated based on the existing HDR, performance deterioration may occur in multiplexing gain (e.g., capacity and latency) of a link due to FDR. Hereinafter, a method of allocating PDSCH/PDSCH DMRS and PUSCH/PUSCH DMRS resource in consideration of the above description will be described.

For example, the base station may allocate PDSCH resource to the UE as a control channel through downlink control information (DCI). At this time, the DCI may include a time domain resource assignment field and a frequency domain resource assignment field. For example, a PDSCH mapping type may be determined in the time domain based on the time domain resource assignment field, a resource assignment type may be determined based on the frequency domain resource assignment field, and PDSCH resource used by the UE may be finally determined. That is, PDSCH resource for the UE to receive downlink data may be indicated by the base station through a field in the DCI. In addition, for example, the DCI transmitted by the base station may include information on a PDSCH DMRS pattern. At this time, the UE may confirm a PDSCH DMRS pattern through the DCI based on the PDSCH scheduled by the base station and perform channel estimation in the PDSCH DMRS to perform data demodulation.

In addition, for example, the base station may indicate the time domain resource and frequency domain resource for the PUSCH as the uplink resource of the UE through the DCI. That is, the UE may transmit uplink data to the base station through the PUSCH resource indicated through the DCI. As another example, the UE may have a semi-statically configured grant for uplink transmission resource. At this time, the UE may select PUSCH resource based on the configured grant and transmit uplink data to the base station, without being limited to the above-described embodiment. In addition, the PUSCH DMRS may also be indicated to the UE by the base station through the DCI. For example, the UE may allocate the PUSCH DMRS based on PUSCH DMRS resource assignment information included in the DCI and transmit the same to the base station along with the PUSCH, without being limited to the above-described embodiment.

As described above, PDSCH and PDSCH DMRS resource for downlink data transmission and PUSCH and PUSCH DMRS resource for uplink data transmission may be determined by the base station and indicated to the UE through a control channel. The UE may check information on the indicated control channel, check resource, through which downlink data is transmitted, and perform a demodulation process. In addition, the UE may check information on the indicated control channel and transmit the scheduled resource including uplink data to the base station, such that the base station and the UE may check resource information used by each other.

Here, as described above, in the UE or base station operating based on the FDR mode, since downlink and uplink operations are simultaneously performed, PDSCH/PDSCH DMRS resource and PUSCH/PUSCH DMRS resource may be considered.

For example, when the UE operating based on the FDR mode estimates, reconstructs and cancels interference with a transmitted signal which is a self-interference signal in PUSCH DMRS resource, performance deterioration may occur in interference estimation, reconstruction and cancellation by the PDSCH allocated to the same resource as the PUSCH DMRS. In addition, when the UE performs channel estimation in the PDSCH DMRS in order to receive the PDSCH from the base station, decoding performance may deteriorate by the PUSCH assigned to the same resource as the PDSCH DMRS resource, thereby causing performance deterioration. Similarly, when the base station operating based on the FDR mode estimates, reconstructs and cancels interference with a transmitted signal which is a self-interference signal in PDSCH DMRS resource, performance deterioration may occur in interference estimation, reconstruction and cancellation by the PUSCH allocated to the same resource as the PDSCH DMRS. In addition, when the base station performs channel estimation in the PUSCH DMRS in order to receive the PUSCH from the UE, decoding performance may deteriorate by the PDSCH allocated to the same resource as the PUSCH DMRS resource, thereby causing performance deterioration.

In consideration of the above points, puncturing is applicable to resource in which the PUSCH DMRS which is a decoding reference signal of a PUSCH which is a transmitted signal is disposed, upon resource allocation for different uplink and downlink channels. In addition, for example, puncturing is applicable to resource in which the PDSCH DMRS is disposed for decoding performance of a PDSCH which is a received signal of the UE, upon resource allocation for different uplink and downlink channels. Therefore, each of the UE and the base station may perform self-interference cancellation and improve received signal reconstruction performance in a signal demodulation process.

More specifically, the case where resources for a PDSCH and a PUSCH are allocated by the base station may be considered. At this time, among resources, to which the PDSCH is allocated, for resource in which the PUSCH DMRS is disposed, the PDSCH may be dropped without being transmitted. That is, in the corresponding resources, the PDSCH resource may be punctured. In addition, among resources, to which the PUSCH is allocated, for resource in which the PDSCH DMRS is disposed, the PUSCH may be dropped without being transmitted. That is, in the corresponding resources, the PDSCH resource may be punctured. Therefore, it is possible to minimize interference in the resource in which the DMRS is transmitted.

As another example, when the base station allocates the PDSCH resource for downlink data transmission, the base station may perform resource allocation excluding resource, to which the PUSCH DMRS is allocated. That is, the base station may prevent the PDSCH from being allocated to the corresponding resource, by excluding the PUSCH DMRS resource from the beginning in the process of allocating the PDSCH resource. Similarly, when the UE allocates the PUSCH resource for uplink data transmission in the resources scheduled by the base station, the UE may perform resource allocation excluding resource, to which the PDSCH DMRS is allocated. That is, the UE may prevent the PUSCH from being allocated to the corresponding resource, by excluding the PDSCH DMRS resource from the beginning in the process of allocating the PUSCH resource As another example, exclusive resource assignment information of the above-described uplink/downlink in the FDR mode may be included as additional information in a corresponding control channel and transmitted to the UE. The UE may check the above-described information through the control channel, perform self-interference cancellation after applying puncturing information when generating an uplink signal, and perform demodulation with respect to a downlink signal. The base station may also perform self-interference cancellation after applying puncturing information when generating a downlink signal based on the above-described information, and perform demodulation with respect to an uplink signal.

Figure 11A:
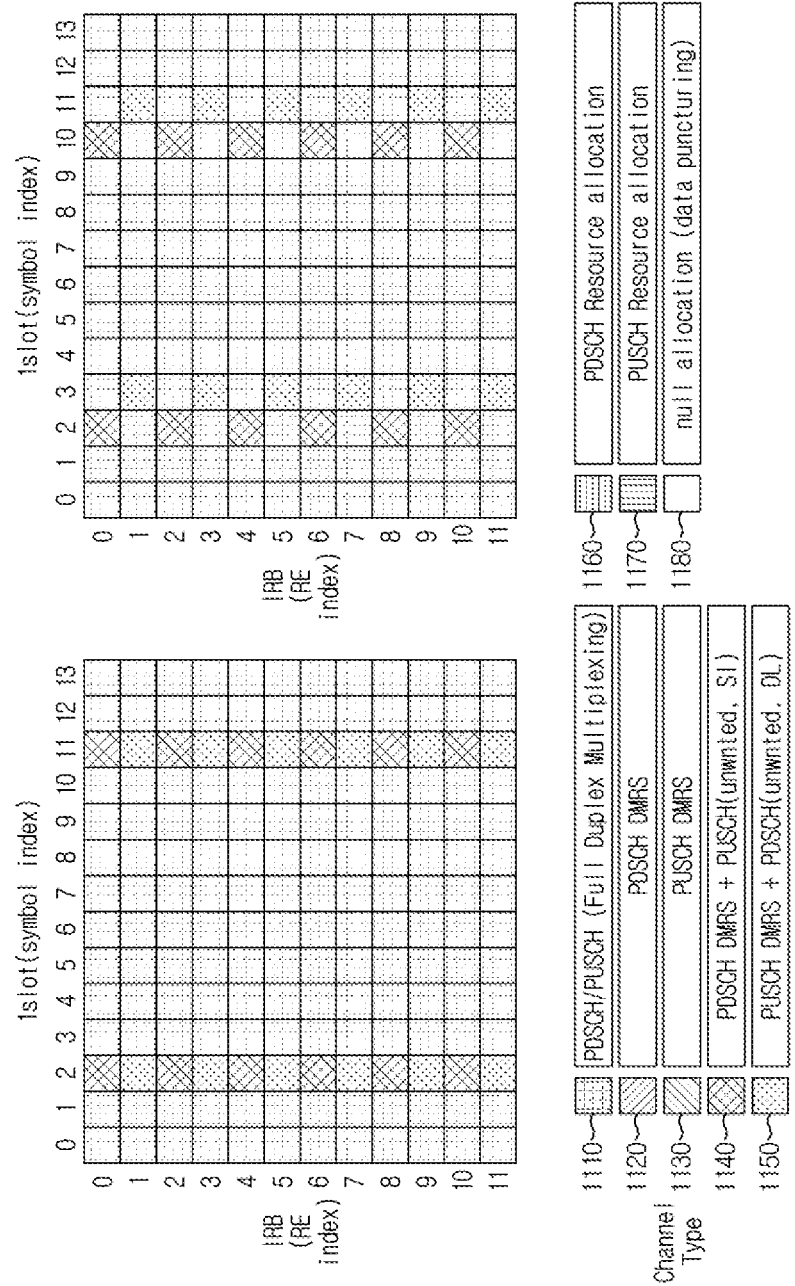
FIG. 11a is a view illustrating a method of allocating resource in an FDR mode according to an embodiment of the present disclosure.
Figure 11B:
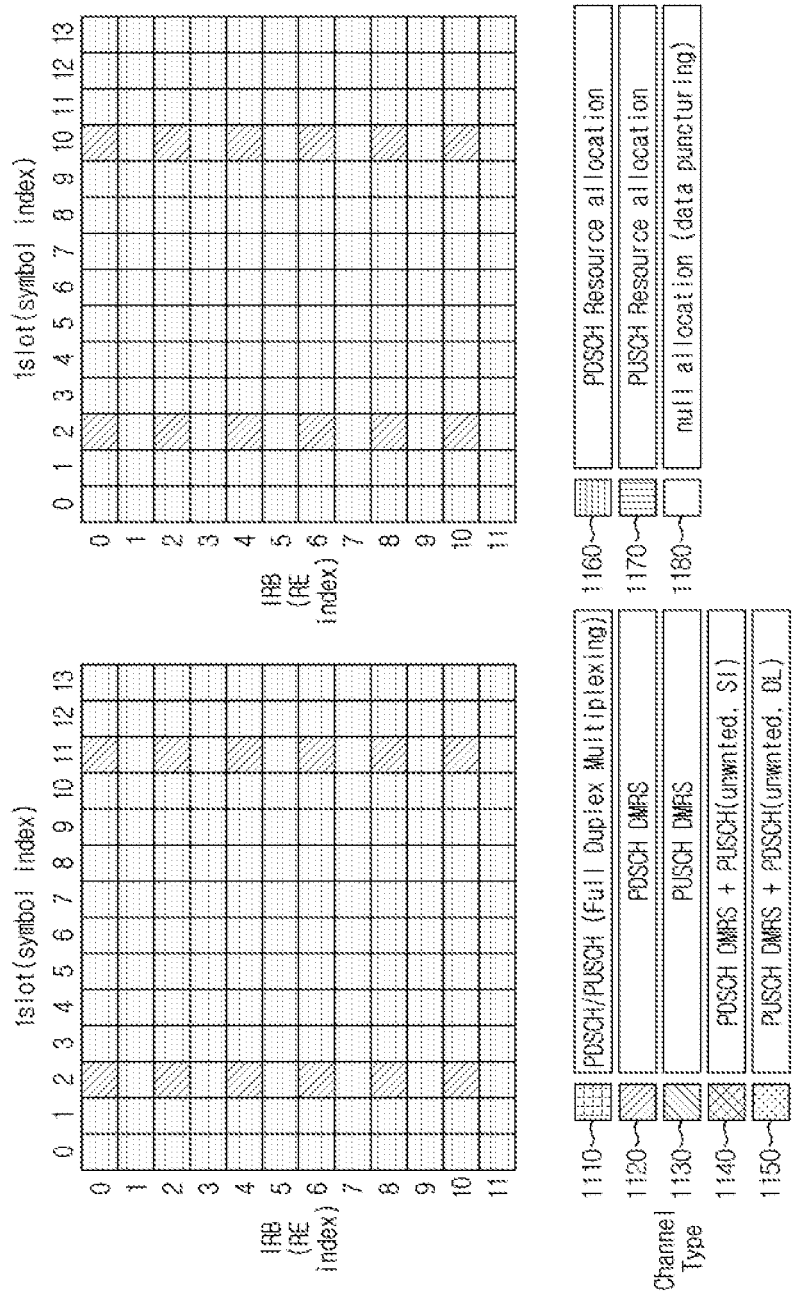
FIG. 11b is a view illustrating a method of allocating resource in an FDR mode according to an embodiment of the present disclosure.
Figure 11C:
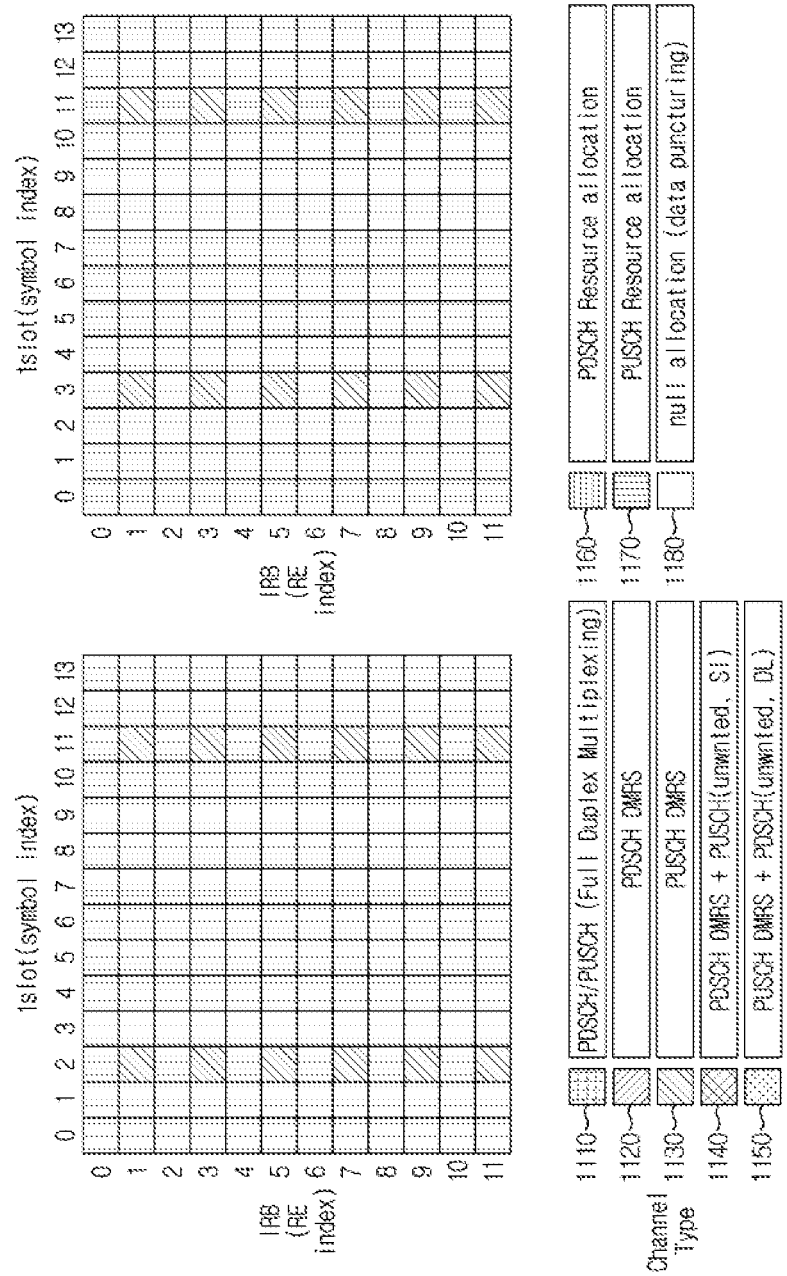
FIG. 11c is a view illustrating a method of allocating resource in an FDR mode according to an embodiment of the present disclosure.

For a more specific example, FIGS. 11a to 11c are views illustrating a method of performing puncturing according to an embodiment of the present disclosure. Operation of a UE or a base station operating based on an FDR mode may be considered. For example, referring to FIG. 11a, resource 1110 through which a PDSCH/PUSCH is simultaneously transmitted and received based on the FDR mode, resource 1120 through which only a PDSCH DMRS is transmitted, resource in which only a PUSCH DMRS 1130 is transmitted, resource 1140 through which a PDSCH DMRS and a PUSCH are simultaneously transmitted and received, resource 1150 through which a PUSCH DMRS and a PDSCH are simultaneously transmitted and received, resource 1160 to which a PDSCH is allocated, resource 1170 to which a PUSCH is allocated and punctured resource (null resource) 1180 may be considered. At this time, referring to FIG. 11b, when the UE receives a downlink signal from the base station, the UE may receive allocation information of the PDSCH resource 1160 including data and PDSCH DMRS resource 1120 for data demodulation, receive the downlink signal based on the same, and perform data demodulation. In addition, referring to FIG. 11c, the UE may receive information on the PUSCH resource 1170 for data transmission and the resource 1130, to which the PUSCH DMRS is allocated, from the base station, allocate data and a PUSCH DMRS to corresponding resource and perform transmission to the base station.

Here, when resource is allocated as shown in FIGS. 11b and 11c, the case where the UE or the base station operating based on the FDR mode simultaneously performs transmission and reception may be considered. At this time, for example, as shown in FIG. 11a, there may be resource 1140 in which a PDSCH DMRS and a PUSCH overlap and resource 1150 in which a PUSCH DMRS and a PDSCH overlap. In a process of canceling self-interference in the overlapping resource or perform channel estimation for data demodulation, performance deterioration may occur.

Figure 12A:
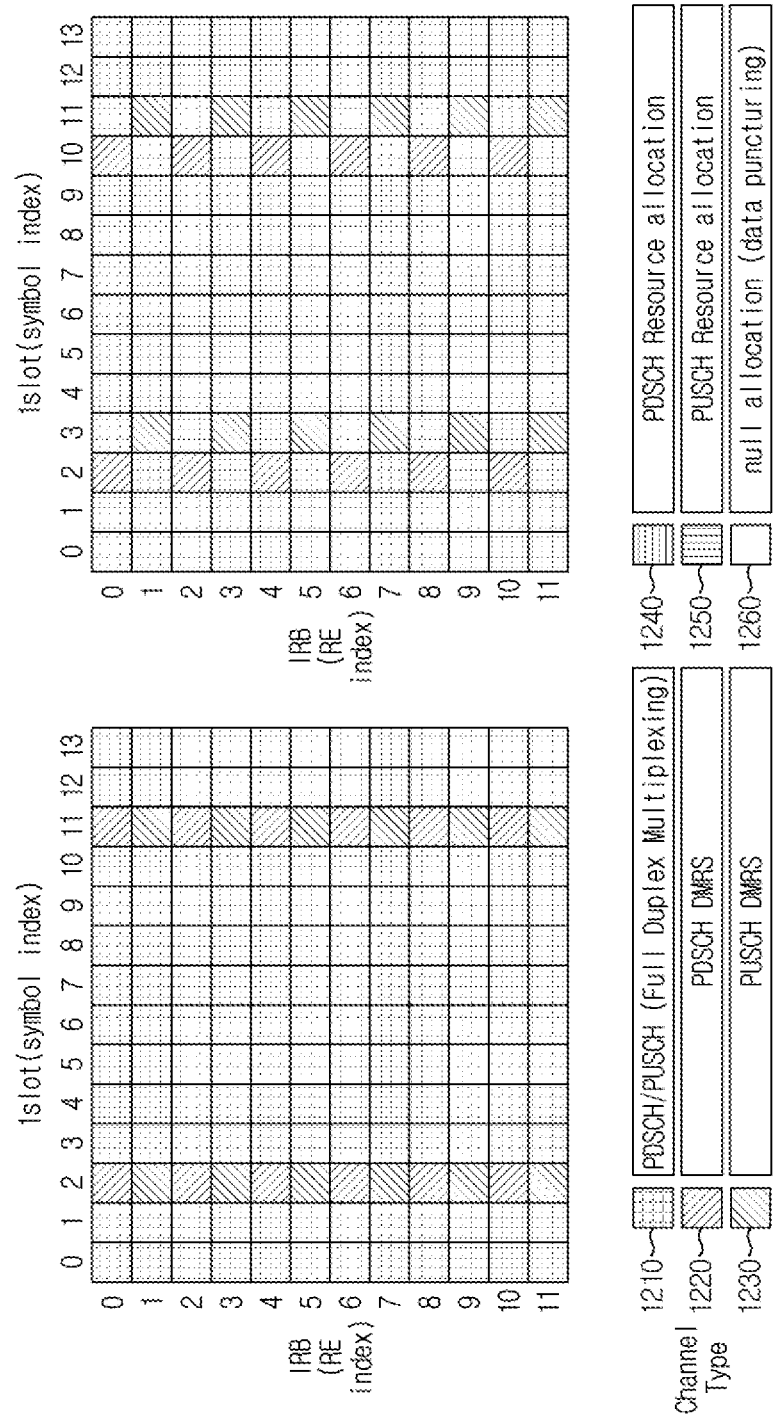
FIG. 12a is a view illustrating a method of puncturing data resource in an FDR mode according to an embodiment of the present disclosure.
Figure 12B:
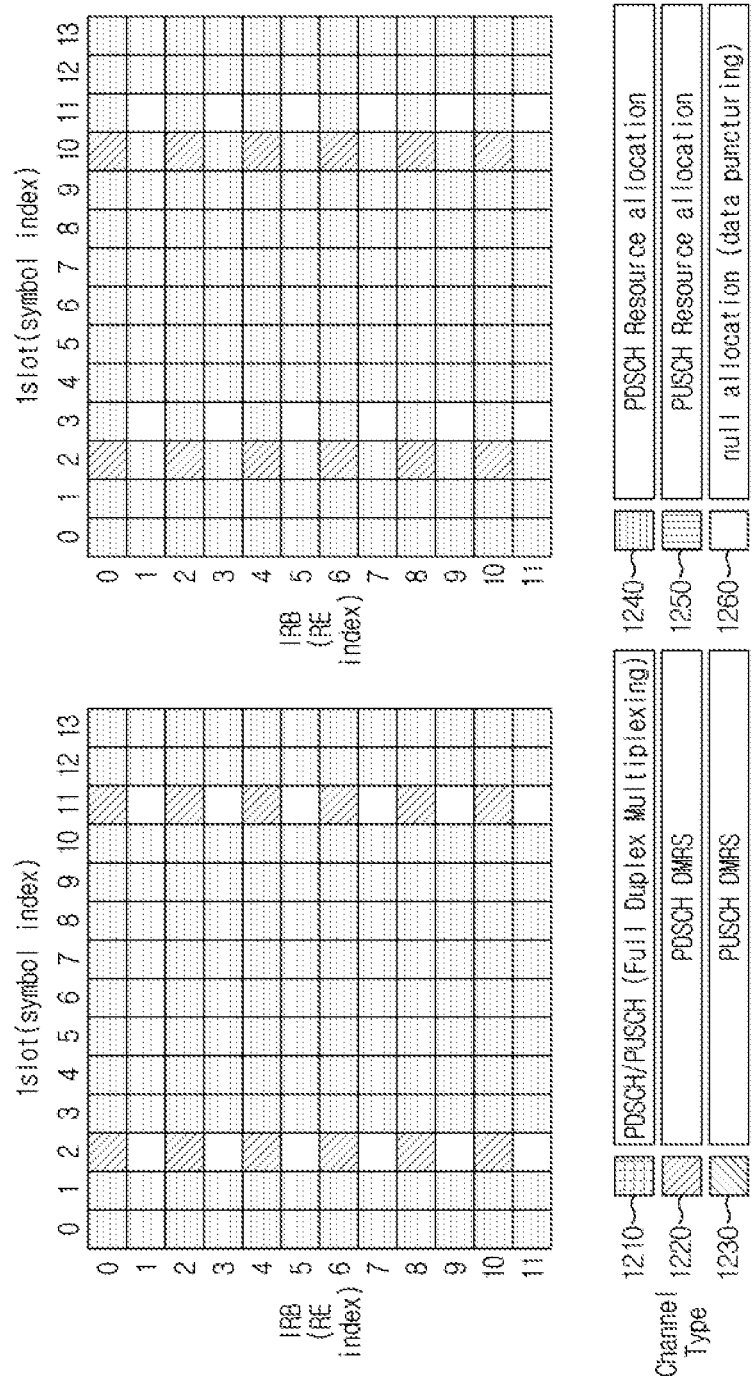
FIG. 12b is a view illustrating a method of puncturing data resource in an FDR mode according to an embodiment of the present disclosure.
Figure 12C:
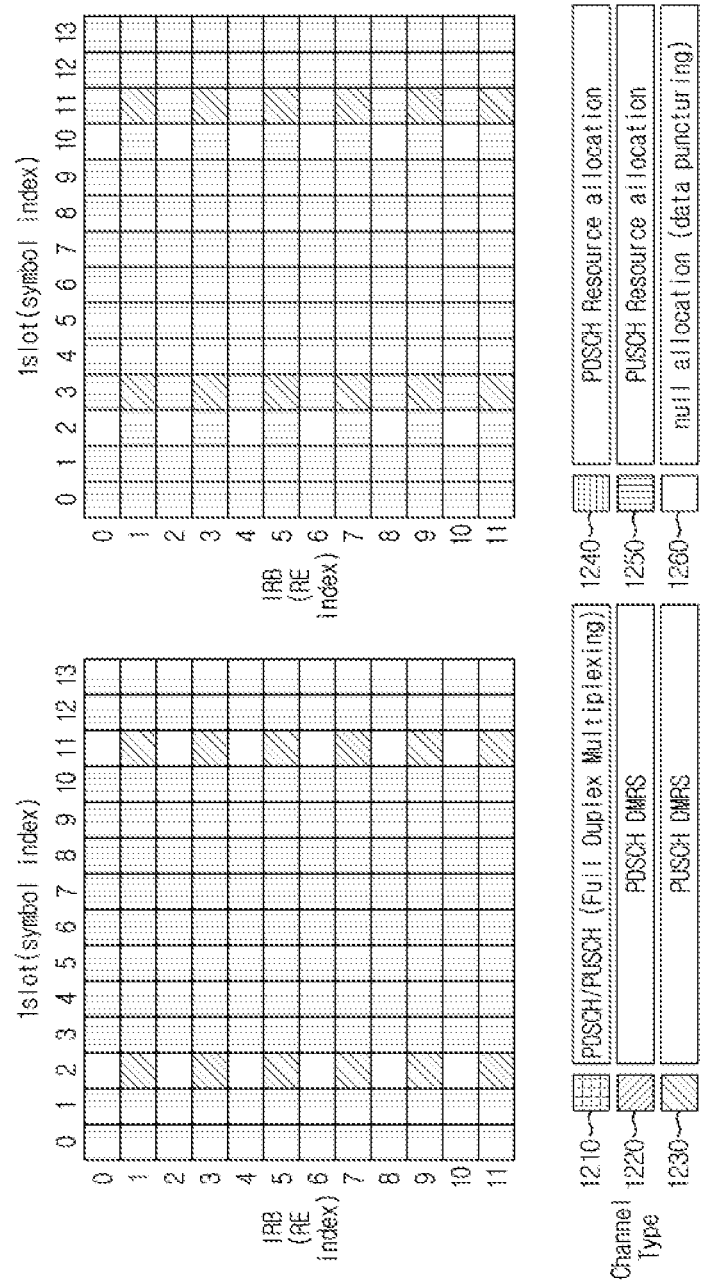
FIG. 12c is a view illustrating a method of puncturing data resource in an FDR mode according to an embodiment of the present disclosure.

In consideration of the above-described point, referring to FIGS. 12a to 12c, transmission of data overlapping the DMRS may be punctured. More specifically, considering FIG. 12a, the UE or the base station operating based on the FDR mode may receive information on the resource 1220 through which the PDSCH DMRS is transmitted and the resource 1230 through which the PUSCH DMRS is transmitted from the base station. At this time, for example, the UE or the base station operating based on the FDR mode may further receive information on resource necessary for puncturing when the resource 1220 through which the PDSCH DMRS is transmitted and the resource 1250 through which the PUSCH is transmitted overlap. In addition, the UE operating based on the FDR mode may further receive information on resource necessary for puncturing when the resource 1230 through which the PUSCH DMRS is transmitted and the resource 1240 through which the PDSCH is transmitted overlap.

Here, referring to FIG. 12b, the base station may perform puncturing with respect to the resource through which the PUSCH DMRS is transmitted based on the above-described information and transmit a downlink signal to the UE. Downlink data allocated to the resource through which the PUSCH DMRS is transmitted may be dropped without being transmitted based on data puncturing. That is, the corresponding resource may be null resource 1260. In addition, since the UE receives the information on puncturing from the base station, the UE may check the resource 1260 in which the PDSCH is punctured, and, in consideration of this, perform demodulation with respect to the downlink signal.

In addition, referring to FIG. 12c, the UE may perform puncturing with respect to the resource through which the PDSCH DMRS is transmitted based on the above-described information and transmit an uplink signal to the base station. That is, uplink data allocated to the resource through which the PDSCH DMRS is transmitted may be dropped without being transmitted based on data puncturing. That is, the corresponding resource may be null resource 1260. In addition, since the base station recognizes the information on puncturing, the base station may check the resource 1260 in which the PUSCH is punctured and, in consideration of this, perform demodulation with respect to the uplink signal. Therefore, it is possible to reduce performance deterioration in the UE and the base station operating based on the FDR mode.

Figure 13:
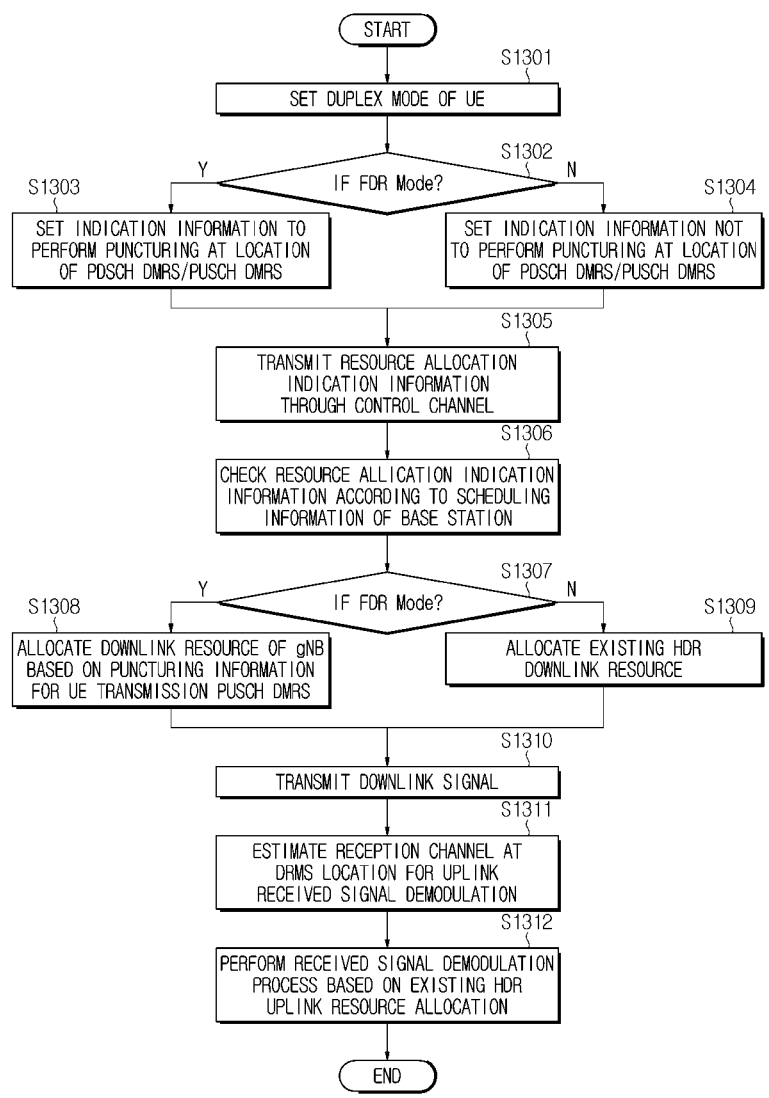
FIG. 13 is a view illustrating a method of operating a base station according to an embodiment of the present disclosure.

FIG. 13 is a view illustrating a method of operating a base station for allocating resource to a UE operating based on an FDR mode according to an embodiment of the present disclosure. Referring to FIG. 13, a duplex mode of the UE may be set (S1301). For example, the duplex mode may be any one of a HDR mode or an FDR mode, as described above. Here, the duplex mode may be determined based on at least one of link quality of the UE or UE implementation information, but is not limited thereto.

In addition, for example, whether the FDR mode is supported may differ between UEs based on UE implementation. As a specific example, a specific UE may support the FDR mode and the HDR mode, and another UE may support only the HDR, without being limited to the above-described embodiment. At this time, the UE may transmit information on whether the FDR mode is supported to the base station as capability information, when performing initial accessing to the base station. As another example, in a process of performing reconnection between the UE and the base station, the corresponding information may be transmitted to the base station, without being limited to the above-described embodiment.

Through the above description, the base station may determine whether the UE supports the FDR mode. At this time, for example, the base station may indicate whether to operate in the FDR mode based on quality of link with the UE or channel information. As a specific example, the base station may report the corresponding information to the base station after channel measurement based on a channel estimation reference signal transmitted to the UE. The base station may indicate whether the UE operates in the FDR mode based on channel measurement information received from the UE. For example, when link quality or a channel environment is good, the base station may indicate that the UE operates in the FDR mode. In contrast, when link quality or a channel environment is not good, the base station may indicate that the UE operates in the HDR mode.

At this time, when the UE operates based on the FDR mode, the base station may set indication information such that puncturing is performed at a location of PDSCH DMRS and PUSCH DMRS resource (S1303). In contrast, when the UE operates based on the HDR, the base station may set indication information such that puncturing is not performed at a location of PDSCH DMRS and PUSCH DMRS resource (S1304). That is, the base station may set the PDSCH/PDSCH DMRS and PUSCH/PUSCH DMRS in the same manner as the existing UE to perform transmission and reception. Thereafter, the base station may transmit resource allocation indication information to the UE through a control channel (S1305). For example, the base station may include the corresponding information in downlink control information (DCI) and transmit the information to the UE.

As a specific example, the resource allocation indication information may be composed of 1-bit information in the DCI. For example, when the resource allocation indication information has a first value, puncturing may be indicated based on the FDR mode and, when the resource allocation indication information has a second value, puncturing may not be indicated, without being limited to the above-described embodiment.

Next, the base station may check the resource allocation indication information according to base station scheduling (S1306). At this time, in the case of the FDR mode (S1307), the base station may puncture the PDSCH allocated to a location corresponding to resource, through which the UE transmits the PUSCH DMRS, based on the above-described information and allocate downlink resource (S1308). In contrast, in the case of the HDR mode (S1307), the base station may allocate resource without puncturing based on the HDR mode (S1309). Thereafter, the base station may transmit a downlink signal to the UE (S1310). Here, the UE may check the downlink signal based on the received information through control information and perform demodulation.

In addition, the base station may perform channel estimation at a PUSCH DMRS location for uplink received signal demodulation transmitted by the UE (S1311). Here, for example, the base station may operate based on the HDR mode and perform a received signal demodulation process based on the existing HDR uplink resource allocation based information (S1312).

Figure 14:
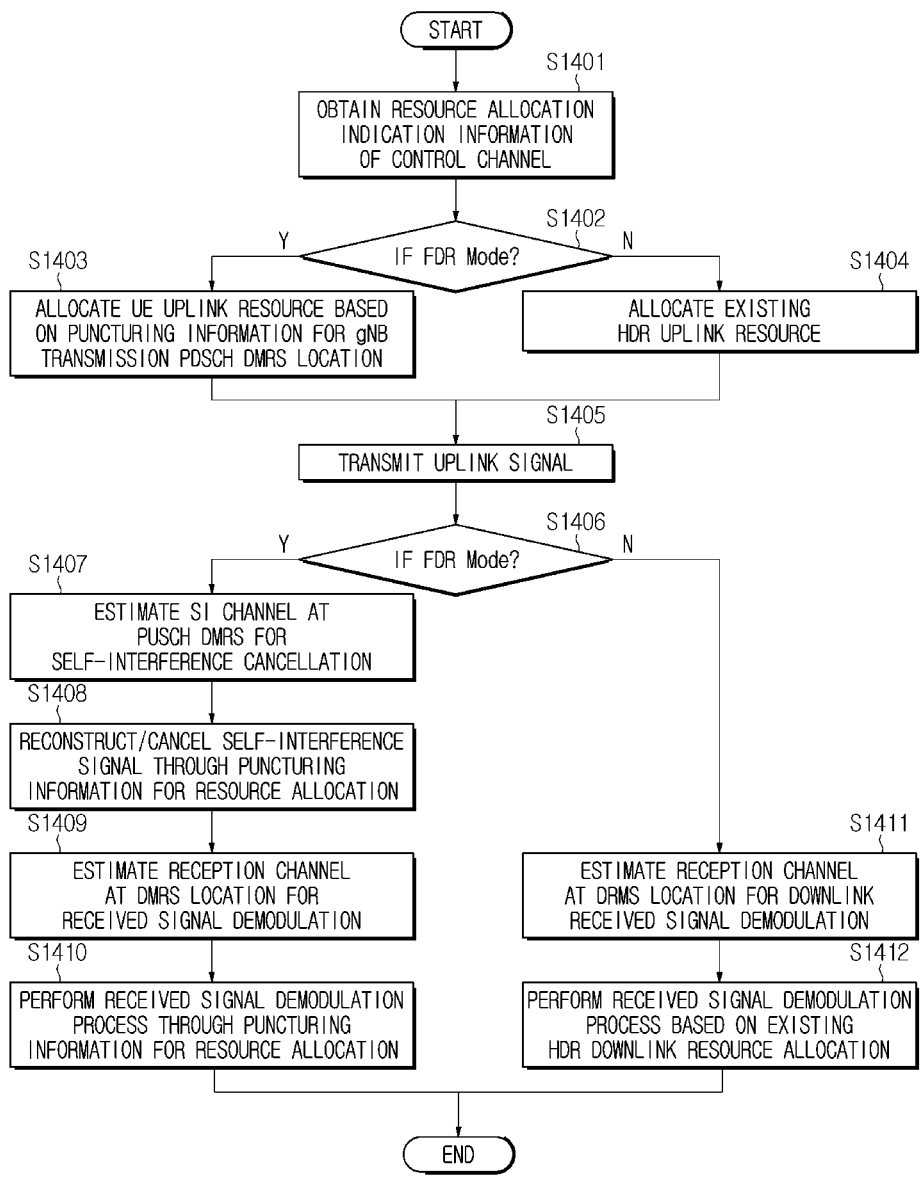
FIG. 14 is a view illustrating a method of operating a UE according to an embodiment of the present disclosure.

FIG. 14 is a view illustrating a signal transmission method of a UE operating based on an FDR mode according to an embodiment of the present disclosure. For example, whether the FDR mode is supported may differ between UEs based on UE implementation. As a specific example, a specific UE may support the FDR mode and the HDR mode, and another UE may support only the HDR, without being limited to the above-described embodiment. At this time, the UE may transmit information on whether the FDR mode is supported to the base station as capability information, when performing initial accessing to the base station. As another example, in a process of performing reconnection between the UE and the base station, the corresponding information may be transmitted to the base station, without being limited to the above-described embodiment.

Through the above description, the base station may determine whether the UE supports the FDR mode. At this time, for example, the base station may indicate whether to operate in the FDR mode based on quality of link with the UE or channel information. As a specific example, a specific UE may report the corresponding information to the base station after channel measurement based on a channel estimation reference signal transmitted to the UE. The base station may indicate whether the UE operates in the FDR mode based on channel measurement information received from the UE. For example, when link quality or a channel environment is good, the base station may indicate that the UE operates in the FDR mode. In contrast, when link quality or a channel environment is not good, the base station may indicate that the UE operates in the HDR mode.

Referring to FIG. 14, the UE may obtain resource allocation indication information of a control channel (S1401). At this time, the resource allocation indication information may indicate whether puncturing is performed based on the duplex mode, as described above. At this time, when the UE operates based on the FDR mode, the base station may set indication information such that puncturing is performed at a location of PDSCH DMRS and PUSCH DMRS resource. In contrast, when the UE operates based on the HDR, the base station may set indication information such that puncturing is not performed at a location of PDSCH DMRS and PUSCH DMRS resource. That is, the base station may set the PDSCH/PDSCH DMRS and the PUSCH/PUSCH DMRS in the same manner as the existing UE to perform transmission/reception. Thereafter, the base station may transmit the resource allocation indication information to the UE through the control channel.

When the resource allocation indication information indicates the FDR mode based on the above description (S1402), the UE may allocate uplink resource based on puncturing information of the PDSCH DMRS location (S1403). In contrast, when the resource allocation indication information indicates the HDR mode (S1402), the UE may allocate resource in the same manner as the existing HDR uplink without considering puncturing at the PDSCH DMRS location (S1404). Thereafter, the UE may transmit an uplink signal to the base station (S1405). At this time, in the case of the FDR mode (S1406), the UE may perform SI channel estimation based on estimation, cancellation and reconstruction of the self-interference signal at the PUSCH DMRS for self-interference cancellation (S1407). At this time, the PDSCH is punctured at the PUSCH DMRS location, and the UE performs reconstruction and cancellation of the self-interference signal based on the corresponding information, thereby preventing performance deterioration (S1408). In addition, the UE may estimate a reception channel at the PDSCH DMRS resource for demodulation of a received signal (S1409). At this time, in the PDSCH DMRS resource, the PUSCH is punctured based on the resource allocation indication information, and the UE performs a received signal demodulation process based on the corresponding information, thereby preventing performance deterioration (S1410).

In contrast, in the case of the HDR mode (S1406), the UE may perform estimation with respect to the reception channel at the PDSCH DMRS location in order to demodulate the received signal (S1411). Thereafter, a received signal demodulation process may be performed based on existing HDR downlink resource allocation information (S1412).

Figure 15:
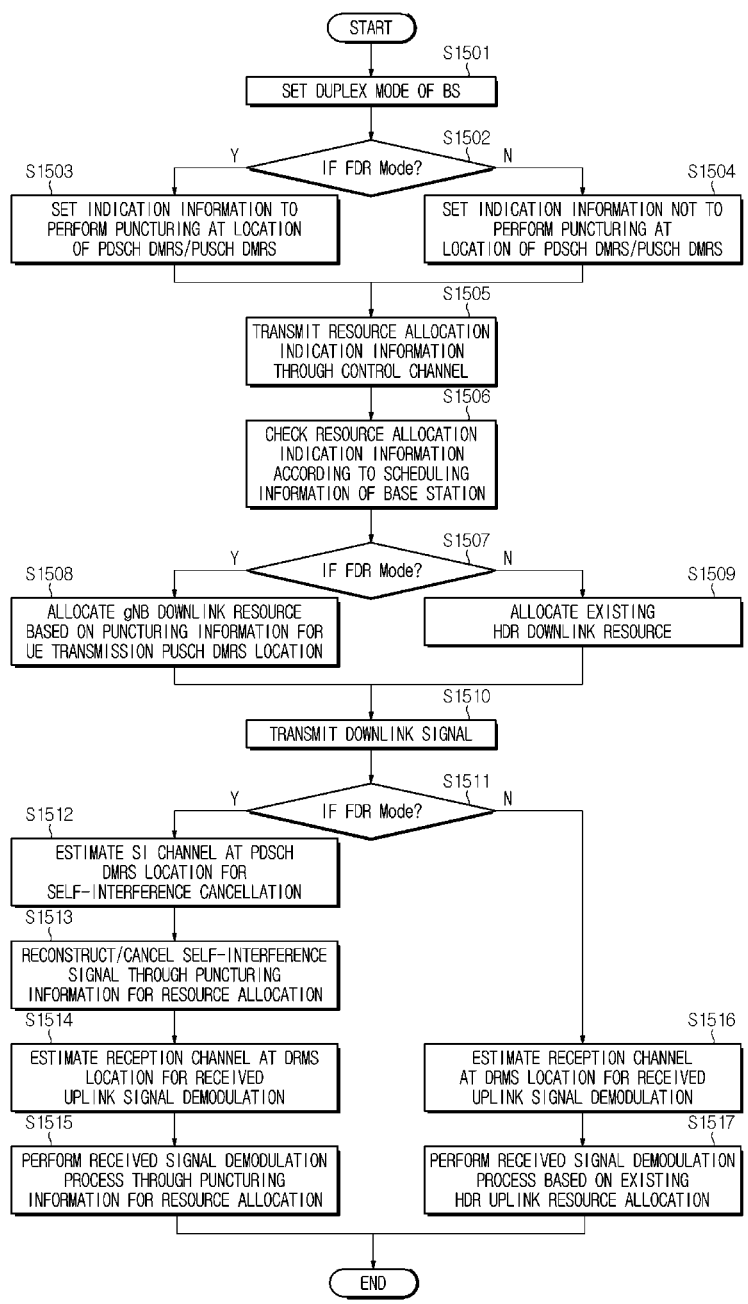
FIG. 15 is a view illustrating a method of operating a base station according to an embodiment of the present disclosure.

FIG. 15 is a view illustrating a signal transmission method of a base station operating based on an FDR mode according to an embodiment of the present disclosure. Referring to FIG. 15, a duplex mode of the base station may be set (S1501). For example, the duplex mode may be any one of a HDR mode or an FDR mode, as described above. Here, the duplex mode may be determined based on at least one of link quality of the base station or base station implementation information, but is not limited thereto.

In addition, for example, the duplex mode of the base station may be differently set for each UE and may be determined based on link quality or a channel environment. As a specific example, the base station may transmit a reference signal for channel estimation to the UE, and the UE may perform channel measurement based on the reference signal and then report this to the base station. At this time, the base station may determine the duplex mode based on the channel measurement information reported by the UE, without being limited to the above-described embodiment.

At this time, when the base station operates based on the FDR mode, the base station may set indication information such that puncturing is performed at the location of the PDSCH DMRS and PUSCH DMRS location (S1503). In contrast, when the base station operates based on the HDR, the base station may set indication information such that puncturing is not performed at the location of the PDSCH DMRS and PUSCH DMRS location (S1504). That is, the base station may set the PDSCH/PDSCH DMRS and the PUSCH/PUSCH DMRS in the same manner as the existing method to perform transmission and reception. Thereafter, the base station may transmit the resource allocation indication information to the UE through the control channel (S1505). For example, the base station may include the corresponding information in downlink control information (DCI) and transmit the information to the UE.

As a specific example, the resource allocation indication information may be composed of 1-bit information in the DCI. For example, when the resource allocation indication information has a first value, puncturing may be indicated based on the FDR mode and, when the resource allocation indication information has a second value, puncturing may not be indicated based on the HDR mode, without being limited to the above-described embodiment.

Next, the base station may check the resource allocation indication information according to base station scheduling (S1506). At this time, in the case of the FDR mode (S1507), the base station may puncture the PDSCH allocated to a location corresponding to resource, through which the UE transmits the PUSCH DMRS, based on the above-described information and allocate downlink resource (S1508). In contrast, in the case of the HDR mode (S1507), the base station may allocate resource without puncturing based on the existing HDR mode (S1509). Thereafter, the base station may transmit a downlink signal to the UE (S1510). Here, the UE may check the downlink signal based on the received information through control information and perform demodulation.

In addition, when the base station operates based on the FDR mode (S1511), the base station may perform SI channel estimation at the PDSCH DMRS location for self-interference cancellation (S1512). Here, the base station may perform estimation, cancellation and reconstruction of the self-interference signal based on puncturing information of resource allocation (S1513). At this time, since the PUSCH is punctured at the PDSCH DMRS location, performance deterioration can be prevented as described above. In addition, the base station may perform estimation with respect to the reception channel at the PUSCH DMRS location for demodulation of the uplink signal received from the UE (S1514). At this time, as described above, since the PDSCH is punctured in the PUSCH DMRS, it is possible to prevent performance deterioration in the received signal demodulation process, as described above (S1515). In contrast, the base station may operate based on the HDR mode, and perform the received signal demodulation process based on the existing HDR uplink resource allocation based information. At this time, the base station may perform estimation with respect to the reception channel at the PUSCH DMRS location in order to demodulate the received signal (S1516). Thereafter, the base station may perform a received signal demodulation process based on existing HDR uplink resource allocation information (S1517).

Figure 16:
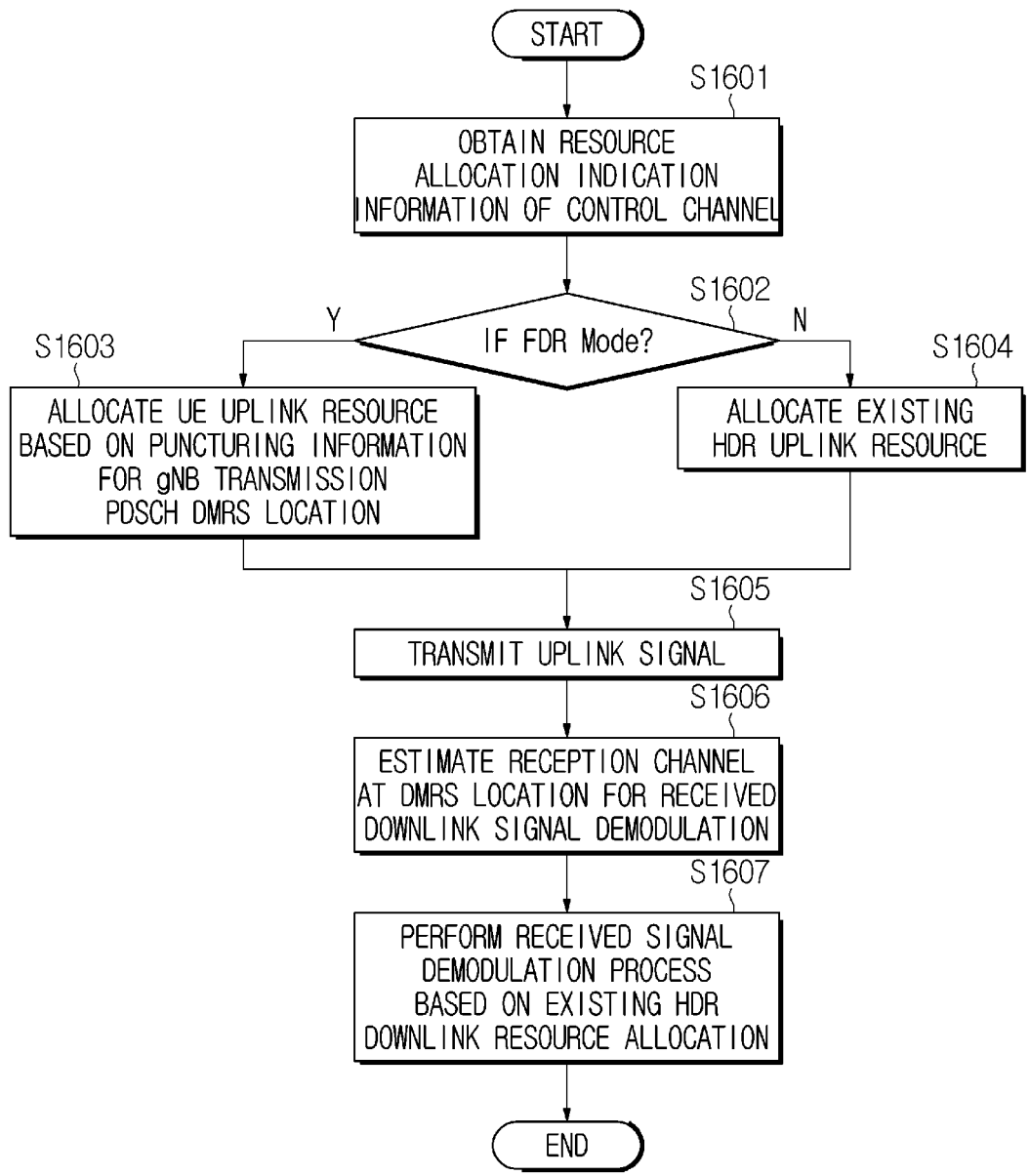
FIG. 16 is a view illustrating a method of operating a UE according to an embodiment of the present disclosure.

FIG. 16 is a view illustrating a method of operating a UE for transmitting a signal to a base station operating based on an FDR mode according to an embodiment of the present disclosure. Referring to FIG. 16, the UE may obtain resource allocation indication information of a control channel (S1601). For example, the resource allocation indication information may be information indicating whether puncturing is performed based on the duplex mode of the base station. For example, the duplex mode of the base station may be differently set for each UE and may be determined based on link quality or a channel environment. As a specific example, the base station may transmit a reference signal for channel estimation to the UE, and the UE may perform channel measurement based on the reference signal and then report this to the base station. At this time, the base station may determine the duplex mode based on the channel measurement information reported by the UE, without being limited to the above-described embodiment.

At this time, when the base station operates based on the FDR mode, the base station may set indication information such that puncturing is performed at the location of the PDSCH DMRS and PUSCH DMRS resource. In contrast, when the base station operates based on the HDR, the base station may set indication information such that puncturing is not performed at the location of the PDSCH DMRS and PUSCH DMRS resource. That is, the base station may set the PDSCH/PDSCH DMRS and the PUSCH/PUSCH DMRS in the same manner as the existing UE to perform transmission/reception. Thereafter, the base station may transmit the resource allocation indication information to the UE through the control channel.

When the resource allocation indication information indicates the FDR mode based on the above description (S1602), the UE may allocate uplink resource based on puncturing information of the PDSCH DMRS location (S1603). In contrast, when the resource allocation indication information indicates the HDR mode (S1602), the UE may allocate resource in the same manner as the existing HDR uplink without considering puncturing at the PDSCH DMRS location (S1604). Thereafter, the UE may transmit an uplink signal to the base station (S1605). At this time, the UE may perform reception channel estimation at the PDSCH DMRS location for downlink received signal demodulation (S1606). At this time, the PUSCH may be punctured at the PDSCH DMRS location, as described above. Thereafter, the UE may perform received signal demodulation process based on existing HDR downlink resource allocation and thus obtain data (S1607).

As another example, the case where both the UE and the base station operate based on the FDR mode may be considered. At this time, the UE may perform SI channel estimation by estimating, cancelling and reconstructing the self-interference signal in the PUSCH DMRS resource. At this time, since the PDSCH is punctured, it is possible to prevent performance deterioration. In addition, the UE may perform demodulation with respect to downlink data through the PDSCH DMRS. Since the PUSCH is punctured, it is possible to prevent performance deterioration. At the same time, the base station may perform SI channel estimation by estimating, cancelling and reconstructing the self-interference signal in the PDSCH DMRS resource. At this time, since the PUSCH is punctured, it is possible to prevent performance deterioration. In addition, the base station may perform demodulation with respect to uplink data through the PUSCH DMRS. Since the PDSCH is punctured, it is possible to prevent performance deterioration.

System and Various Devices, to which Embodiments of the Present Disclosure are Applicable Various embodiments of the present disclosure may be combined with each other.

Hereinafter, a device, to which various embodiments of the present disclosure are applicable, will be described. Although not limited thereto, various descriptions, functions, procedures, proposes, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 17:
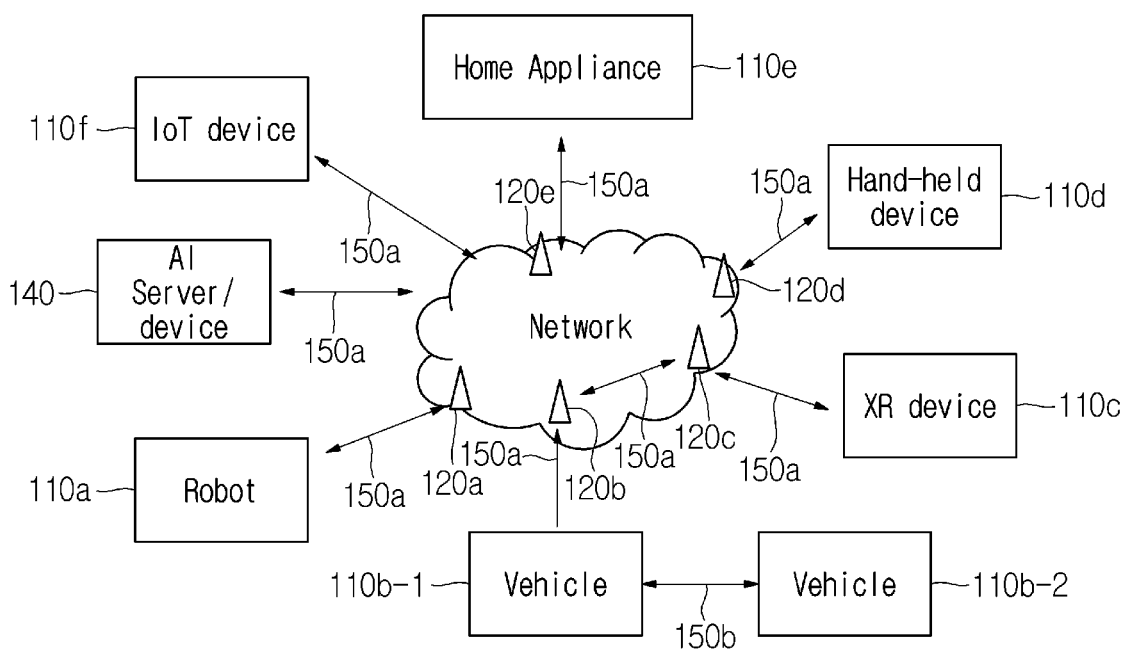
FIG. 17 is a view illustrating an example of a communication system according to an embodiment of the present disclosure.

FIG. 17 illustrates an example of a communication system according to an embodiment of the present disclosure. The embodiment of FIG. 17 may be combined with various embodiments of the present disclosure.

Referring to FIG. 17, a communication system applied to the present disclosure includes a wireless device, a base station and a network. Here, the wireless device means a device for performing communication using radio access technology (e.g., 5G NR or LTE) and may be referred to as a communication/wireless/5G device. Although not limited thereto, the wireless device may include at least one of a robot 110a, vehicles 110b-1 and 110b-2, an extended reality (XR) device 110c, a hand-held device 110d, a home appliance 110e, an Internet of Thing (IoT) device 110f or an artificial intelligence (AI) device/server 110g. For example, the vehicle may include a vehicle having a wireless communication function, an autonomous vehicle, a vehicle capable of performing vehicle-to-vehicle communication or the like. Here, the vehicles 110b-1 and 110b-2 may include an unmanned aerial vehicle (UAV) (e.g., drone). The XR device 110c may include an augmented reality (AR)/virtual reality (VR)/mixed reality (MR) device and may be implemented in the form of a head-mounted device (HMD), a head-up display provided in a vehicle, a television, a smartphone, a computer, a wearable device, a home appliance, a digital signage, a vehicle, a robot, etc. The hand-held device 110d may include a smartphone, a smart pad, a wearable device (e.g., a smartwatch or smart glasses), a computer (e.g., a laptop, etc.), etc. The home appliance 110e may include a TV, a refrigerator, a washing machine, etc. The IoT device 110f may include a sensor, a smart meter, etc. For example, the base stations 120a to 120e and the network may be implemented by a wireless device, and the specific wireless device 120a may operate as a base station/network node for the other wireless devices.

Here, wireless communication technology implemented in the wireless devices 110a to 110f of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 110a to 110f of this disclosure may perform communication based on LTE-M technology. In this case, for example, the LTE-M technology may be an example of LPWAN technology, and may be referred to as various names such as eMTC (enhanced Machine Type Communication). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 110a to 110f of this disclosure may include at least one of ZigBee considering low-power communication, Bluetooth or low power wide area network (LPWAN), without being limited to the above-described names. For example, the ZigBee technology may generate personal area networks (PANs) related to small/low-power digital communication based on various standards such as IEEE 802.15.4 and may be referred to as various names.

The wireless devices 110a to 110f may be connected to the network through the base station 120a to 120e. AI technology is applicable to the wireless devices 110a to 110f, and the wireless devices 110a to 110f may be connected to the AI server 110g through the network. The network may be configured using a 3G network, a 4G (e.g., LTE) network, a 5G (e.g., NR) network, etc. The wireless devices 110a to 110f may communicate with each other through the base station 120a to 120e/network, or may perform direct communication (e.g., sidelink communication) without the base station 120a to 120e/network. For example, the vehicles 110b-1 and 110b-2 may perform direct communication (e.g., V2V (vehicle to vehicle)/V2X (vehicle to everything) communication). In addition, the IoT device 110f (e.g., a sensor) may perform direct communication with another IoT device (e.g., a sensor) or the other wireless devices 110a to 110f.

Wireless communication/connection 150a, 150b or 150c may be performed/established between the wireless devices 110a to 110f/base station 120a to 120e and the base station 120a to 120e/base station 120a to 120e. Here, wireless communication/connection may be performed/established through various radio access technologies (e.g., 5G NR) such as uplink/downlink communication 150a, sidelink communication 150b (or D2D communication) or BS-to-BS communication 150c (e.g., relay or integrated access backhaul (IAB)). The wireless device and the base station/wireless device or the base station and the base station may transmit/receive radio signals to/from each other through wireless communication/network 150a, 150b or 150c. For example, wireless communication/network 150a, 150b or 150c may enable signal transmission/reception through various physical channels. To this end, based on various proposes of the present disclosure, at least some of various configuration information setting processes for transmission/reception of radio signals, various signal processing procedures (e.g., channel encoding/decoding, modulation/demodulation, resource mapping/demapping, etc.) or resource allocation processes may be performed.

Figure 18:
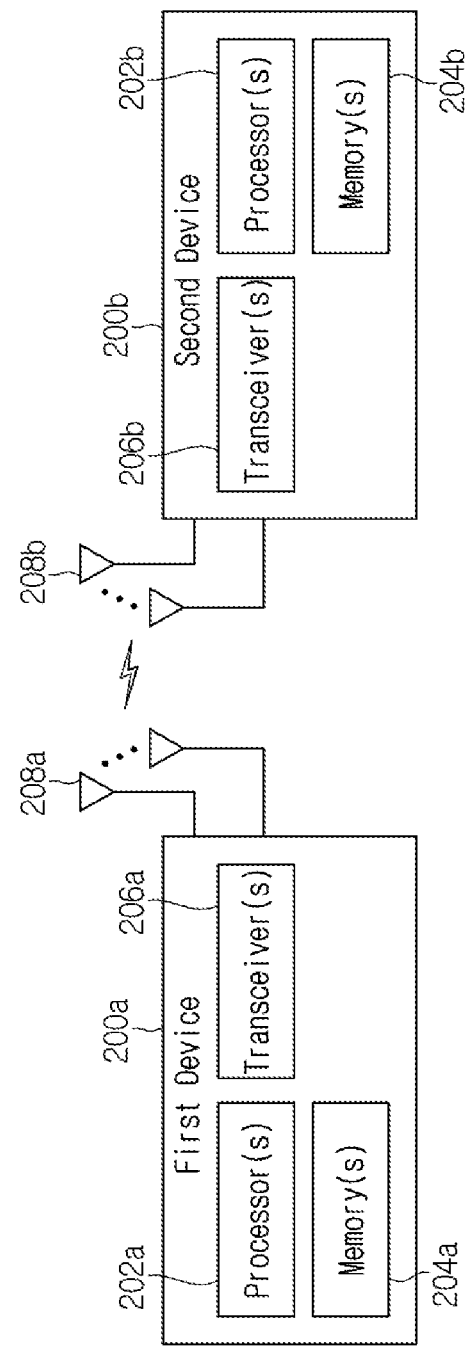
FIG. 18 is a view illustrating an example of a wireless device according to an embodiment of the present disclosure.

FIG. 18 illustrates an example of a wireless device according to an embodiment of the present disclosure.

Referring to FIG. 18, a first wireless device 200a and a second wireless device 200b may transmit/receive radio signals through various radio access technologies (e.g., LTE or NR). Here, {the first wireless device 200a and the second wireless device 200b} may correspond to {the wireless device 110x and the base station 120x} and/or {the wireless device 110x and the wireless device 110x} of FIG. 1.

The first wireless device 200a includes one or more processors 202a and one or more memories 204a and may further include one or more transceivers 206a and/or one or more antennas 208a. The processor 202a may be configured to control the memory 204a and/or the transceiver 206a and to implement the descriptions, functions, procedures, proposes, methods and/or operation flowcharts disclosed in the present disclosure. For example, the processor 202a may process information in the memory 204a to generate first information/signal and then transmit a radio signal including the first information/signal through the transceiver 206a. In addition, the processor 202a may receive a radio signal including second information/signal through the transceiver 206a and thus store information obtained from signal processing of the second information/signal in the memory 204a. The memory 204a may be connected to the processor 202a to store a variety of information related to operation of the processor 202a. For example, the memory 204a may perform some or all of the processes controlled by the processor 202a or store software code including commands for performing the descriptions, functions, procedures, proposes, methods and/or operation flowcharts disclosed in the present disclosure. Here, the processor 202a and the memory 204a may be a portion of a communication modem/circuit/chip designed to implement wireless communication technology (e.g., LTE or NR). The transceiver 206a may be connected to the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may mean a communication modem/circuit/chip.

The second wireless device 200b performs wireless communication with the first wireless device 200a, includes one or more processors 202b and one or more memories 204b and may further include one or more transceivers 206b and/or one or more antennas 208b. The functions of the one or more processors 202b, the one or more memories 204b, the one or more transceivers 206b and/or the one or more antennas 208b are similar to those of the one or more processors 202a, the one or more memories 204a, the one or more transceivers 206a and/or the one or more antennas 208a of the first wireless device 200a.

Hereinafter, the hardware elements of the wireless devices 200a and 200b will be described in greater detail. Although not limited thereto, one or more protocol layers may be implemented by one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), messages, control information, data or information according to the descriptions, functions, procedures, proposes, methods and/or operation flowcharts disclosed in the present disclosure. The one or more processors 202a and 202b may generate and provide signals (e.g., baseband signals) including the PDUs, the SDUs, the messages, the control information, the data or the information to the one or more transceivers 206a and 206b according to the functions, procedures, proposes and/or methods disclosed in the present disclosure. The one or more processors 202a and 202b may receive signals (e.g., baseband signals) from one or more transceivers 206a and 206b to obtain the PDUs, the SDUs, the messages, the control information, the data or the information according to the descriptions, functions, procedures, proposes, methods and/or operation flowcharts disclosed in the present disclosure.

The one or more processors 202a and 202b may be referred to as controllers, microcontrollers or microcomputers. The one or more processors 202a and 202b may be implemented by hardware, firmware, software or a combination thereof. For example, one or more ASICs (application specific integrated circuits), one or more DSPs (digital signal processors), one or more DSPDs (digital signal processing devices), one or more PLDs (programmable logic devices) or one or more FPGAs (field programmable gate arrays) may be included in the one or more processors 202a and 202b. The descriptions, functions, procedures, proposes, methods and/or operation flowcharts disclosed in the present disclosure may be implemented using firmware or software, and the firmware or software may be implemented to include modules, procedures, functions, etc. The firmware or software configured to perform descriptions, functions, procedures, proposes, methods and/or operation flowcharts disclosed in the present disclosure may be included in the one or more processors 202a and 202b or stored in the one or more memories 204a and 204b and driven by the one or more processors 202a and 202b. The descriptions, functions, procedures, proposes, methods and/or operation flowcharts disclosed in the present disclosure may be implemented using firmware or software in the form of code, a command and/or a set of commands.

The one or more memories 204a and 204b may be connected to the one or more processors 202a and 202b to store various types of data, signals, messages, information, programs, code, instructions and/or commands. The one or more memories 204a and 204b may include a ROM (read only memory), a RAM (random access memory), an EPROM (erasable programmable read only memory), a flash memory, a hard drive, a register, a cache memory, a computer-readable storage medium and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit, to one or more other devices, user data, control information, radio signals/channels, etc. described in the methods and/or operation flowcharts of the present disclosure. The one or more transceivers 206a and 206b may receive, from one or more other devices, user data, control information, radio signals/channels, etc. described in the descriptions, functions, procedures, proposes, methods and/or operation flowcharts disclosed in the present disclosure. In addition, the one or more transceivers 206a and 206b may be connected to the one or more antennas 208a and 208b and may be configured to transmit/receive user data, control information, radio signals/channels, etc. described in the descriptions, functions, procedures, proposes, methods and/or operation flowcharts disclosed in the present disclosure through the one or more antennas 208a and 208b. In the present disclosure, one or more antennas may be a plurality of physical antennas or a plurality of logical antennas (e.g., antenna ports). The one or more transceivers 206a and 206b may convert the received radio signals/channels, etc. from RF band signals to the baseband signals, in order to process the received user data, control information, radio signals/channels, etc. using the one or more processors 202a and 202b. The one or more transceivers 206a and 206b may convert the user data, control information, radio signals/channels, etc. processed using the one or more processors 202a and 202b from a baseband signal to an RF band signal. To this end, the one or more transceivers 206a and 206b may include an (analog) oscillator and/or a filter.

Figure 19:
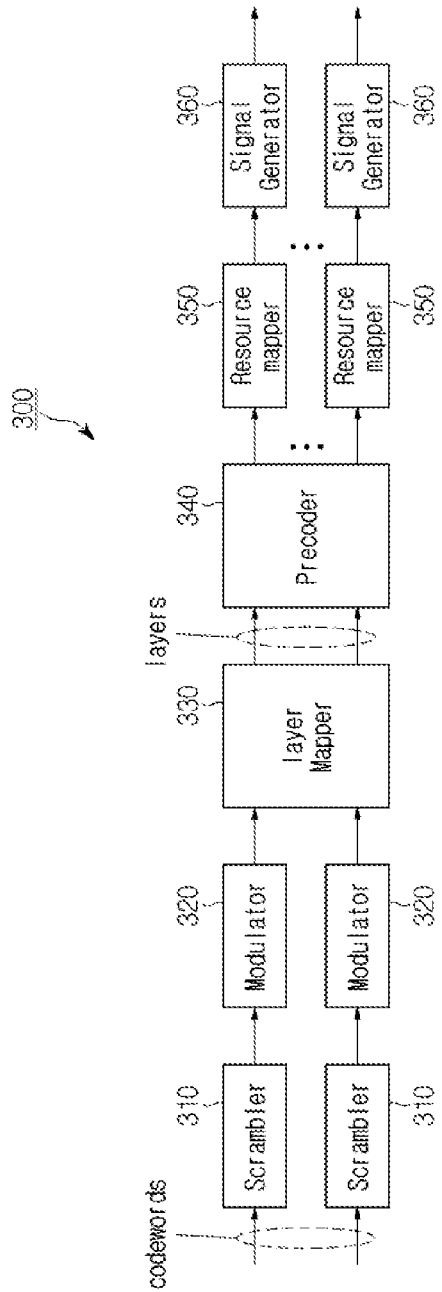
FIG. 19 is a view illustrating a circuit for processing a transmitted signal according to an embodiment of the present disclosure.

FIG. 19 illustrates a circuit for processing a transmitted signal according to an embodiment of the present disclosure. The embodiment of FIG. 19 may be combined with various embodiments of the present disclosure.

Referring to FIG. 19, a signal processing circuit 300 may include a scrambler 310, a modulator 320, a layer mapper 330, a precoder 340, a resource mapper 350 and a signal generator 360. In this case, for example, the operation/function of FIG. 19 may be performed by the processors 202a and 202b and/or the transceivers 206a and 206b of FIG. 18. In addition, for example, the hardware element of FIG. 19 may be implemented in the processors 202a and 202b and/or the transceivers 206a and 206b of FIG. 18. For example, blocks 310 to 360 may be implemented in the processors 202a and 202b of FIG. 18. Alternatively, the blocks 310 to 350 may be implemented in the processors 202a and 202b of FIG. 18 and the block 360 may be implemented in the transceivers 206a and 206b of FIG. 18, without being limited to the above-described embodiment.

The codeword may be converted into a radio signal through the signal processing circuit 300 of FIG. 19. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 19. Specifically, the codeword may be converted into a bit sequence scrambled by the scrambler 310. The scramble sequence used for scramble is generated based on an initialization value and the initialization value may be included in ID information, etc. of the wireless device. The scrambled bit sequence may be modulated to a modulation symbol sequency by the modulator 320. A modulation scheme may include pi/2-BPSK(pi/2-binary phase shift keying), m-PSK (m-phase shift keying), m-QAM(m-quadrature amplitude modulation), etc.

A complex modulation symbol sequence may be mapped to one or more transport layers by the layer mapper 330. The modulation symbols of each transport layer may be mapped to the corresponding antenna port(s) by the precoder 340 (precoding). The output z of the precoder 340 may be obtained by multiplying the output y of the layer mapper 330 by a N*M precoding matrix W. Here, N is the number of antenna ports and M is the number of transport layers. Here, the precoder 340 may perform precoding after performing transform precoding (e.g., discrete Fourier transform (DFT) with respect to complex modulation symbols. In addition, the precoder 340 may perform precoding without performing transform precoding.

The resource mapper 350 may map the modulation symbols of each antenna port to time-frequency resources. The time-frequency resources may include a plurality of symbols (e.g., CP-OFDMA symbols and DFT-s-OFDMA symbols) in the time domain and include a plurality of subcarriers in the frequency domain. The signal generator 360 may generate a radio signal from the mapped modulation symbols and transmit the generated radio signal to another device through each antenna. To this end, the signal generator 360 may include an inverse fast Fourier transform (IFFT) module and a cyclic prefix (CP) inserter, a digital-to-analog converter (DAC), a frequency uplink converter, etc.

A signal processing procedure for a received signal in a wireless device may be performed inversely to the signal processing procedure of FIG. 19. For example, the wireless device (e.g., 200a and 200b of FIG. 18) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover and a fast Fourier transform (FFT) module. Thereafter, the baseband signal may be restored to a codeword through a resource de-mapper processor, a postcoding processor, a demodulation process and a de-descramble process. The codeword may be restored to an original information block through decoding. Accordingly, a signal processing circuit (not shown) for the received signal may include a signal restorer, a resource de-mapper, a postcoder, a demodulator, a de-scrambler and a decoder.

Figure 20:
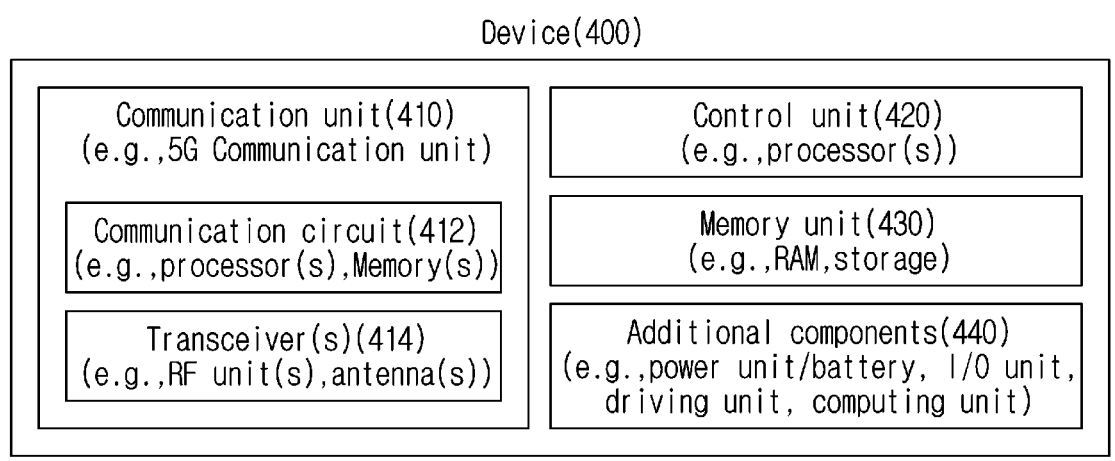
FIG. 20 is a view illustrating another example of a wireless device according to an embodiment of the present disclosure.

FIG. 20 illustrates another example of a wireless device according to an embodiment of the present disclosure. The embodiment of FIG. 20 may be combined with various embodiments of the present disclosure.

Referring to FIG. 20, the wireless device 300 corresponds to the wireless devices 200a and 200b of FIG. 18 and may include various elements, components, units and/or modules. For example, the wireless device 400 may include a communication unit 410, a control unit 420, a memory unit 430 and additional components 440.

The communication unit 410 may include a communication circuit 412 and transceiver(s) 414. The communication unit 410 may transmit and receive signals (e.g., data, control signals, etc.) to and from other wireless devices or base stations. For example, the communication circuit 412 may include the one or more processors 202a and 202b and/or the one or more memories 204a and 204b of FIG. 18. For example, the transceiver(s) 414 may include the one or more transceivers 206a and 206b and/or the one or more antennas 208a and 208b of FIG. 18.

The control unit 420 may consist of a set of one or more processors. For example, the control unit 420 may consist of a set of a communication control processor, an application processor (AP), an electronic control unit (ECU), a graphics processor and a memory control processor. The control unit 420 may be electrically connected to the communication unit 410, the memory unit 430 and the additional components 440 to control overall operation of the wireless device. For example, the control unit 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 using a wireless/wired interface or store, in the memory unit 430, the information received from the outside (e.g., another communication device) through the communication unit 410 using a wireless/wired interface.

The memory unit 430 may include a RAM, a DRAM (dynamic RAM), a ROM, a flash memory, a volatile memory, a non-volatile memory and/or a combination thereof. The memory unit 430 may store data/parameters/programs/code/commands necessary to drive the wireless device 400. In addition, the memory unit 430 may store input/output data/information, etc.

The additional components 440 may be variously configured according to the type of the wireless device. For example, the additional components 440 may include at least one of a power unit/battery, an input/output unit, a driving unit or a computing unit. Although not limited thereto, the wireless device 400 may be implemented in the form of a robot (FIG. 1, 110a), a vehicle (FIGS. 1, 110b-1 and 110b-2), an XR device (FIG. 1, 110c), a hand-held device (FIG. 1, 110d), a home appliance (FIG. 1, 110e), an IoT device (FIG. 1, 1100, a digital broadcast terminal, a hologram device, a public safety device, an MTC device, a medical device, a Fintech device (or a financial device), a security device, a climate/environment device, an AI server/device (FIG. 1, 140), or a network node. The wireless device is movable or may be used at a fixed place according to the use example/service.

Figure 21:
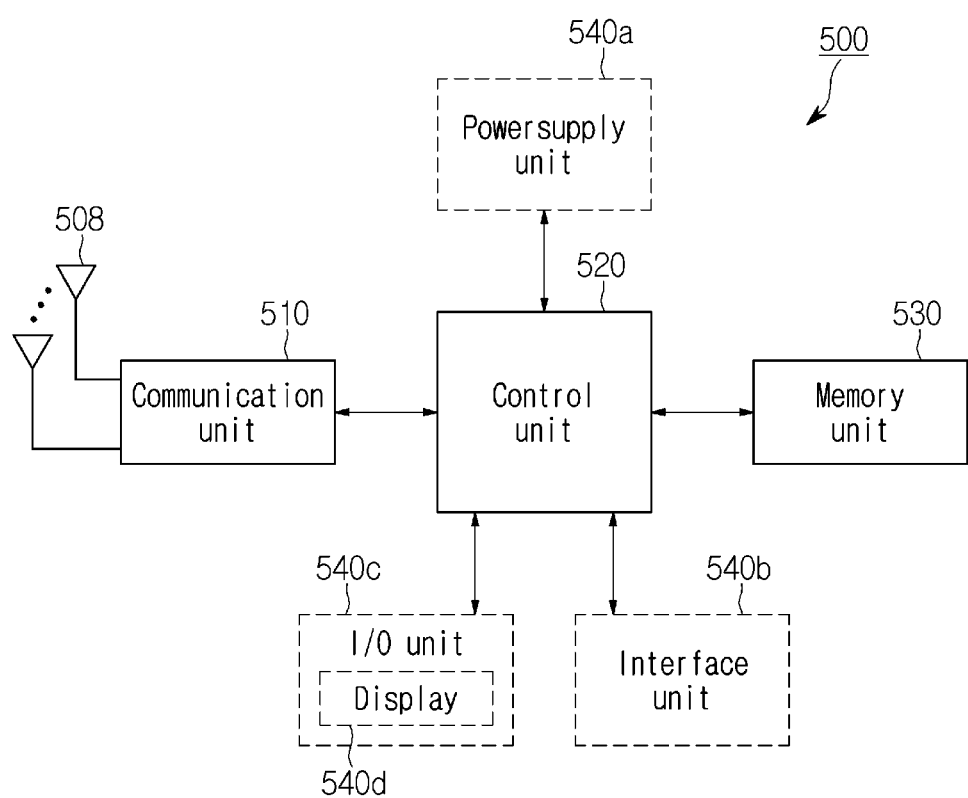
FIG. 21 is a view illustrating an example of a hand-held device according to an embodiment of the present disclosure.

FIG. 21 illustrates an example of a hand-held device according to an embodiment of the present disclosure. FIG. 21 shows a hand-held device applied to the present disclosure. The hand-held device may include a smartphone, a smart pad, a wearable device (e.g., a smartwatch or smart glasses), a portable computer (e.g., a laptop), etc. The embodiment of FIG. 21 may be combined with various embodiments of the present disclosure.

Referring to FIG. 21, the hand-held device 500 may include an antenna unit 508, a communication unit 510, a control unit 530, a power supply unit 540a, an interface unit 540b and an input/output unit 540c. The antenna unit 508 may be a portion of the communication unit 510. Blocks 510 to 530/540a to 540c may respectively correspond to the blocks 410 to 430/440 of FIG. 20 and a repeated description thereof will be omitted.

The communication unit 510 may transmit and receive signals, the control unit 520 may control the hand-held device 500, and the memory unit 530 may store data, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output image video information/signals, audio information/signals, data and/or information received from a user. The input/output unit 540c may include a camera, a microphone, a user input unit, a display 540d, a speaker and/or a haptic module.

For example, in the case of data communication, the input/output unit 540c may obtain information/signals (e.g., touch, text, voice, image or video) received from the user and store the obtained information/signals in the memory unit 530. The communication unit 510 may convert the information/signals stored in the memory into radio signals and transmit the converted radio signals to another wireless device directly or to the base station. In addition, the communication unit 510 may receive the radio signals from another wireless device or the base station and then restore the received radio signals into original information/signals. The restored information/signals may be stored in the memory unit 530 and then output through the input/output unit 540c in various forms (e.g., text, voice, image, video or haptic).

Figure 22:
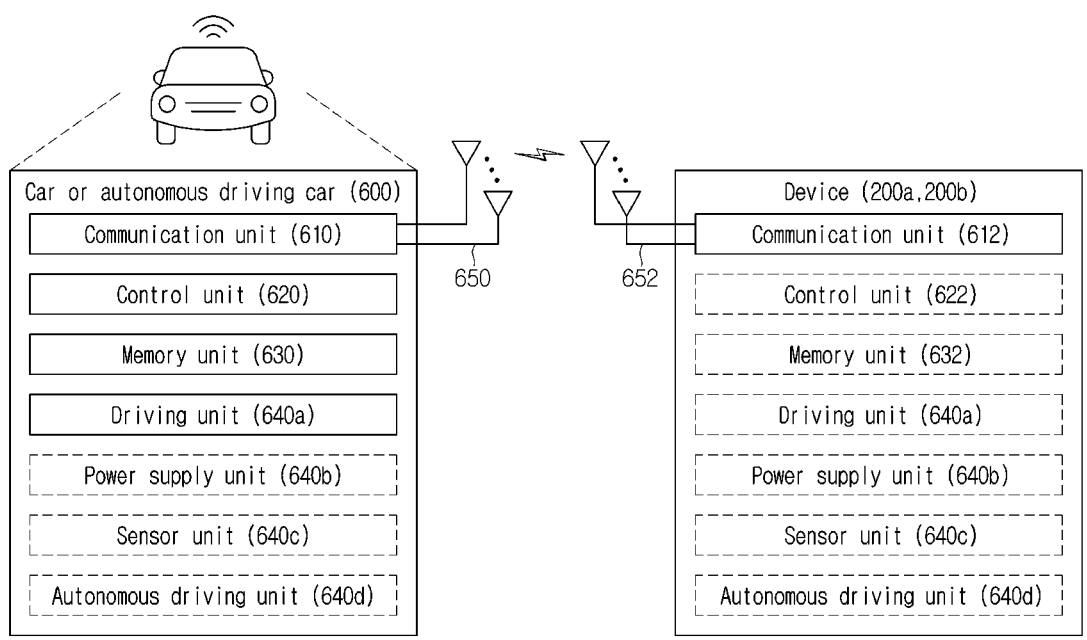
FIG. 22 is a view illustrating an example of a vehicle or an autonomous vehicle according to an embodiment of the present disclosure.

FIG. 22 illustrates an example of a vehicle or an autonomous vehicle according to an embodiment of the present disclosure. FIG. 22 shows a vehicle or an autonomous vehicle applied to the present disclosure. The vehicle or autonomous vehicle may be implemented by a mobile robot, a car, a train, a manned/unmanned Aerial Vehicle (AV), a ship, etc., but the shape of the vehicle is not limited. The embodiment of FIG. 22 may be combined with various embodiments of the present disclosure.

Referring to FIG. 22, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 608 may be configured as a part of the communication unit 610. The blocks 610/630/640a-640d correspond to the blocks 510/530/540 of FIG. 21, respectively, and a repeated description thereof will be omitted.

The communication unit 610 may transmit and receive signals (e.g., data and control signals) to and from external devices such as other vehicles, BSs (e.g., gNBs and road side units), and servers. The control unit 620 may perform various operations by controlling elements of the vehicle or the autonomous vehicle 600. The control unit 620 may include an Electronic Control Unit (ECU). The driving unit 640a may cause the vehicle or the autonomous vehicle 600 to drive on a road. The driving unit 640a may include an engine, a motor, a powertrain, a wheel, a brake, a steering device, etc. The power supply unit 640b may supply power to the vehicle or the autonomous vehicle 600 and include a wired/wireless charging circuit, a battery, etc. The sensor unit 640c may obtain a vehicle state, ambient environment information, user information, etc. The sensor unit 640c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640a such that the vehicle or the autonomous vehicle 600 may move along the autonomous driving path according to the driving plan (e.g., speed/direction control). In the middle of autonomous driving, the communication unit 610 may aperiodically/periodically obtain recent traffic information data from the external server and obtain surrounding traffic information data from neighboring vehicles. In the middle of autonomous driving, the sensor unit 640c may obtain a vehicle state and/or surrounding environment information. The autonomous driving unit 640d may update the autonomous driving path and the driving plan based on the newly obtained data/information. The communication unit 610 may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The embodiments of the present disclosure have the following effects.

According to the present disclosure, it is possible to efficiently maintain self-interference cancellation performance of a certain level or more in a UE performing full duplex radio (FDR) communication.

The effects of the present disclosure are not limited to the above-described effects and other effects which are not described herein may be derived by those skilled in the art from the description of the embodiments of the present disclosure. That is, effects which are not intended by the present disclosure may be derived by those skilled in the art from the embodiments of the present disclosure.

Since examples of the above-described proposed method may also be included as one of the implementation methods of the present disclosure, it is obvious that they may be regarded as a kind of proposed method. In addition, the above-described proposed methods may be implemented independently, but may be implemented in the form of a combination (or merge) of some of the proposed methods. The rule can be defined so that the base station informs the UE of information indicating whether the proposed methods are applicable (or information on the rules of the proposed methods) through a predefined signal (e.g., a physical layer signal or a higher layer signal).

The present disclosure may be embodied in other specific forms without departing from the technical idea and essential features described in the present disclosure. Therefore, the detailed description above should not be construed as restrictive in all respects and should be considered as illustrative. The scope of the present disclosure should be determined by reasonable interpretation of the appended claims, and all changes within the equivalent scope of the present disclosure are included in the scope of the present disclosure. In addition, the embodiments may be configured by combining claims that do not have an explicit citation relationship in the claims, or new claims may be included by amendment after the application is filed.

What is claimed is:

1. A method of operating a user equipment (UE) in a wireless communication system, the method comprising:
    obtaining resource allocation indication information from a base station through a control channel;
    determining a UE operation mode based on the resource allocation indication information;
    transmitting an uplink signal by allocating physical uplink shared channel (PUSCH) resource;
    receiving a downlink signal by allocating physical downlink shared channel (PDSCH);
    wherein the PUSCH is punctured at a location corresponding to a PDSCH demodulation reference signal (DMRS) resource and the PDSCH is punctured at a location corresponding to a PUSCH DMRS resource when the resource allocation indication information indicates that the UE operating mode is a full duplex multiplexing radio (FDR) mode, and self-interference channel estimation is performed based on the PUSCH DMRS resource and the punctured PDSCH, and reception channel estimation and demodulation data are performed based on the PDSCH DMRS and the punctured PUSCH, and
    wherein the PUSCH is not punctured at the location corresponding to the PDSCH DMRS resource and the PDSCH is not punctured at the location corresponding to the PUSCH DMRS resource when the UE operating mode is a half duplex multiplexing radio (HDR) mode.

2. The method of claim 1,
    wherein the UE operation mode is set to the FDR mode, when the resource allocation indication information has a first value, and
    wherein the UE operation mode is set to the HDR mode, when the resource allocation indication information has a second value.

3. The method of claim 1, wherein the control channel further comprises resource allocation information of at least one of the PDSCH, the PDSCH DMRS, the PUSCH or the PUSCH DMRS.

4. The method of claim 1, wherein, when the UE performs initial connection with the base station, capability information of the UE mode is exchanged.

5. The method of claim 4, wherein, when the UE supports the FDR mode based on capability information of the UE mode, the base station determines the UE mode in consideration of at least one of quality of a link with the UE or a channel environment and generates the resource allocation indication information.

6. A user equipment (UE) in a wireless communication system, the UE comprising:
    a transceiver; and
    a processor connected to the transceiver, wherein the processor is configured to:
        obtain resource allocation indication information from a base station through a control channel;
        determine a UE operation mode based on the resource allocation indication information;
        transmit an uplink signal by allocating physical uplink shared channel (PUSCH) resource; and
        receive a downlink signal by allocating physical downlink shared channel (PDSCH);
    wherein the PUSCH is punctured at a location corresponding to a PDSCH demodulation reference signal (DMRS) resource and the PDSCH is punctured at a location corresponding to a PUSCH DMRS resource when the resource allocation indication information indicates that the UE operating mode is a full duplex multiplexing radio (FDR) mode, and self-interference channel estimation is performed based on the PUSCH DMRS resource and the punctured PDSCH, and reception channel estimation and demodulation data are performed based on the PDSCH DMRS and the punctured PUSCH, and
    wherein the PUSCH is not punctured at the location corresponding to the PDSCH DMRS resource and the PDSCH is not punctured at the location corresponding to the PUSCH DMRS resource when the UE operating mode is a half duplex multiplexing radio (HDR) mode.

7. A method of operating a base station in a wireless communication system, the method comprising:
    determining a base station operation mode;
    transmitting resource allocation indication information to a user equipment (UE) through a control channel based on the determined base station operation mode;
    transmitting a downlink signal by allocating physical downlink shared channel (PDSCH) resource;
    receive an uplink signal by allocating physical uplink shared channel (PUSCH);
    wherein the PUSCH is punctured at a location corresponding to a PDSCH demodulation reference signal (DMRS) resource and the PDSCH is punctured at a location corresponding to a PUSCH DMRS resource when the resource allocation indication information indicates that the base station operating mode is a full duplex multiplexing radio (FDR) mode, and self-interference channel estimation is performed based on the PDSCH DMRS resource and the punctured PDSCH, and
    wherein the PUSCH is not punctured at the location corresponding to the PDSCH DMRS resource and the PDSCH is not punctured at the location corresponding to the PUSCH DMRS resource when the UE operating mode is a half duplex multiplexing radio (HDR) mode.

8. The method of claim 7,
    wherein the base station operation mode is set to the FDR mode when the resource allocation indication information has a first value, and
    wherein the base station operation mode is set to the HDR mode when the resource allocation indication information has a second value.

9. The method of claim 7, wherein the control channel further comprises resource allocation information of at least one of the PDSCH, the PDSCH DMRS, the PUSCH or the PUSCH DMRS.

* * * * *